(12) United States Patent
Low

(10) Patent No.: US 9,187,683 B2
(45) Date of Patent: *Nov. 17, 2015

(54) HEAT TRANSFER COMPOSITIONS

(75) Inventor: Robert E. Low, Cheshire (GB)

(73) Assignee: Mexichem Amanco Holding S.A. De C.V., Tlalnepantla, Estado de Mexico (MX)

( * ) Notice: Subject to any disclaimer, the term of this patent is extended or adjusted under 35 U.S.C. 154(b) by 15 days.

This patent is subject to a terminal disclaimer.

(21) Appl. No.: 13/578,336

(22) PCT Filed: Feb. 14, 2011

(86) PCT No.: PCT/GB2011/000198
§ 371 (c)(1),
(2), (4) Date: Aug. 10, 2012

(87) PCT Pub. No.: WO2011/101618
PCT Pub. Date: Aug. 25, 2011

(65) Prior Publication Data
US 2012/0305480 A1 Dec. 6, 2012

(30) Foreign Application Priority Data
Feb. 16, 2010 (GB) .................... 1002618.5

(51) Int. Cl.
*C09K 5/04* (2006.01)
*C08J 9/14* (2006.01)
(Continued)

(52) U.S. Cl.
CPC ................. *C09K 5/045* (2013.01); *C08J 9/146* (2013.01); *C09K 3/30* (2013.01); *C11D 7/505* (2013.01); *C08J 2207/04* (2013.01); *C09K 2205/126* (2013.01); *C09K 2205/22* (2013.01);
(Continued)

(58) Field of Classification Search
CPC ............. C11D 5/045; C11D 2205/126; C11D 2205/22
USPC ........................................ 252/67, 68
See application file for complete search history.

(56) References Cited

U.S. PATENT DOCUMENTS 8,926,856 B2 * 1/2015 Low ................................ 252/67
2005/0245421 A1 11/2005 Singh et al.
(Continued)

FOREIGN PATENT DOCUMENTS

WO WO 2005/105947 A2 11/2005 ............... C09K 5/04
WO WO 2005/108522 A1 11/2005 ............... C09K 5/04
(Continued)

OTHER PUBLICATIONS

International Search Report and the Written Opinion of the International Searching Authority dated Aug. 19, 2011, issued in PCT/GB2011/000198, 16 pgs., International Searching Authority of the European Patent Office, Rijswijk, The Netherlands.
(Continued)

*Primary Examiner* — John Hardee
(74) *Attorney, Agent, or Firm* — Brinks Gilson & Lione

(57) ABSTRACT

The invention provides a heat transfer composition consisting essentially of from about 62 to about 78% by weight trans-1,3,3,3-tetrafluoropropene (R-1234ze(E)) and from about 22 to about 38% by weight of 1,1-difluoroethane (R-152a). The invention also provides a heat transfer composition comprising from about 20 to about 40% by weight R-152a, from about 5 to about 55% R-134a, and from about 5 to about 75% by weight R-1234ze(E).

54 Claims, 1 Drawing Sheet

(51) Int. Cl.
*C09K 3/30* (2006.01)
*C11D 7/50* (2006.01)

(52) U.S. Cl.
CPC ........ *Y10T29/4935* (2015.01); *Y10T 29/49716* (2015.01); *Y10T 137/85978* (2015.04)

(56) References Cited

U.S. PATENT DOCUMENTS

| | | |
|---|---|---|
| 2005/0247905 A1 | 11/2005 | Singh et al. |
| 2006/0243945 A1 | 11/2006 | Minor et al. ..................... 252/67 |
| 2008/0314073 A1 | 12/2008 | Minor ............................. 62/498 |
| 2009/0285764 A1 | 11/2009 | Singh et al. |

FOREIGN PATENT DOCUMENTS

| | | | | |
|---|---|---|---|---|
| WO | WO 2007/053697 A3 | 5/2007 | ............... | C09K 5/04 |
| WO | WO 2009/003165 A1 | 12/2008 | | |
| WO | WO 2009/079201 A1 | 6/2009 | | |
| WO | WO 2009/089511 A2 | 7/2009 | | |
| WO | WO 2010/119265 A1 | 10/2010 | ............... | C09K 5/04 |
| WO | WO 2011/101619 A3 | 8/2011 | ............... | C09K 5/04 |
| WO | WO 2011/101620 A3 | 8/2011 | ............... | C09K 5/04 |

OTHER PUBLICATIONS

International Search Report and the Written Opinion of the International Searching Authority dated Aug. 19, 2011, issued in PCT/GB2011/000199, 16 pgs., International Searching Authority of the European Patent Office, Rijswijk, The Netherlands.

International Search Report and the Written Opinion of the International Searching Authority dated Aug. 19, 2011, issued in PCT/GB2011/000200, 14 pgs., International Searching Authority of the European Patent Office, Rijswijk, The Netherlands.

*Designation and Safety Classification of Refrigerants*, 2007, 38 pgs., ANSI/ASHRAE Standard 34/2007, ISSN: 1041-2336.

*Designation and Safety classification of Refrigerants*, 2006, 34 pgs., ANSI/ASHRAE Addenda a, b, c, e, f, k, n, o, p, q, r, s, and u to ANSI/ASHRAE Standard 34/2004, ISSN: 1041-2336.

ASTM E681-04, *Standard Test Method for Concentration Limits of Flammability of Chemicals (Vapors and Gases)*, 2004, 12 pgs., ASTM International.

Total equivalent warming impact, 2013, http://en.wikipedia.org/wiki/Total_equivalent_warming_impact.

Lemmon, Huber, and McLinden, *NIST Reference Fluid Thermodynamic and Transport Properties—REFPROP Version 8.0 User's Guide*, Apr. 2007, 57 pgs., U.S. Department of Commerce, Gaithersburg, Maryland.

Papasavva and Hill, *Global Refrigerants Energy & Environmental Mobile Air Conditioning—Life Cycle Climate Performance*, Jul. 17, 2007, 35 pgs., SAE 8$^{th}$ Alternate Refrigerant Systems Symposium, Scottsdale, Arizona, http://www.sae.org/events/aars/presentations/2007papasavva.pdf.

Poling, Prausnitz, and O'Connell, *The Properties of Gases and Liquids*, 2001, 264 pages, Extracts from Chapters 2-4 and 6-8, McGraw Hill, New York.

Takizawa et al, *Reaction Stoichiometry for Combustion of Fluoroethane Blends*, Jul. 1, 2006 pp. 1-12, ASHRAE Transactions, ISSN: 0001-2505.

\* cited by examiner

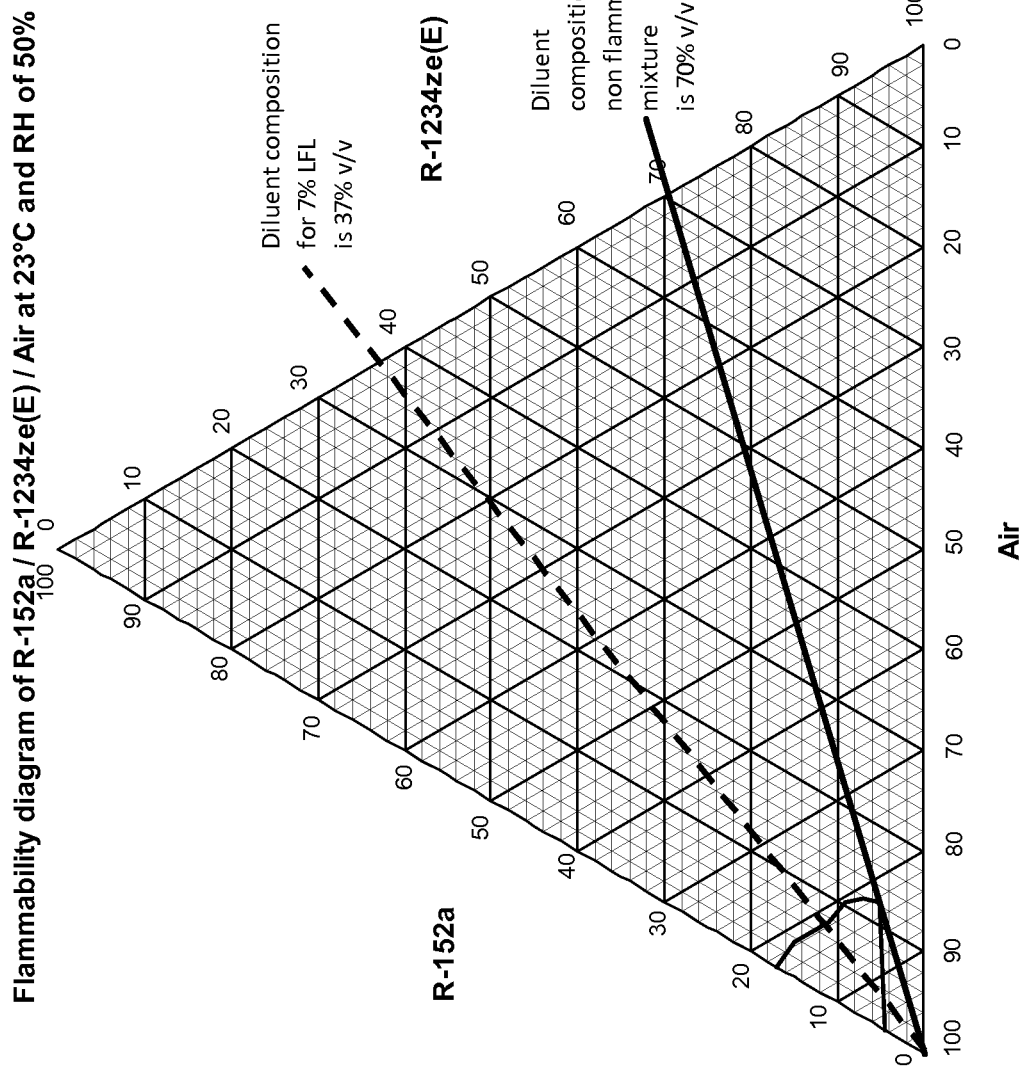

HEAT TRANSFER COMPOSITIONS

CROSS-REFERENCE TO RELATED APPLICATIONS

This application is the U.S. National Phase under 35 U.S.C. §371 of International Application No. PCT/GB2011/000198, filed Feb. 14, 2011, designating the United States and published in English on Aug. 25, 2011, as WO 2011/101618, which claims priority to United Kingdom Application No. 1002618.5, filed Feb. 16, 2010, each of which is incorporated by reference in its entirety.

FIELD

The invention relates to heat transfer compositions, and in particular to heat transfer compositions which may be suitable as replacements for existing refrigerants such as R-134a, R-152a, R-1234yf, R-22, R-410A, R-407A, R-407B, R-407C, R507 and R-404a.

BACKGROUND

The listing or discussion of a prior-published document or any background in the specification should not necessarily be taken as an acknowledgement that a document or background is part of the state of the art or is common general knowledge.

Mechanical refrigeration systems and related heat transfer devices such as heat pumps and air-conditioning systems are well known. In such systems, a refrigerant liquid evaporates at low pressure taking heat from the surrounding zone. The resulting vapour is then compressed and passed to a condenser where it condenses and gives off heat to a second zone, the condensate being returned through an expansion valve to the evaporator, so completing the cycle. Mechanical energy required for compressing the vapour and pumping the liquid is provided by, for example, an electric motor or an internal combustion engine.

In addition to having a suitable boiling point and a high latent heat of vaporisation, the properties preferred in a refrigerant include low toxicity, non-flammability, non-corrosivity, high stability and freedom from objectionable odour. Other desirable properties are ready compressibility at pressures below 25 bars, low discharge temperature on compression, high refrigeration capacity, high efficiency (high coefficient of performance) and an evaporator pressure in excess of 1 bar at the desired evaporation temperature.

Dichlorodifluoromethane (refrigerant R-12) possesses a suitable combination of properties and was for many years the most widely used refrigerant. Due to international concern that fully and partially halogenated chlorofluorocarbons were damaging the earth's protective ozone layer, there was general agreement that their manufacture and use should be severely restricted and eventually phased out completely. The use of dichlorodifluoromethane was phased out in the 1990's.

Chlorodifluoromethane (R-22) was introduced as a replacement for R-12 because of its lower ozone depletion potential. Following concerns that R-22 is a potent greenhouse gas, its use is also being phased out.

Whilst heat transfer devices of the type to which the present invention relates are essentially closed systems, loss of refrigerant to the atmosphere can occur due to leakage during operation of the equipment or during maintenance procedures. It is important, therefore, to replace fully and partially halogenated chlorofluorocarbon refrigerants by materials having zero ozone depletion potentials.

In addition to the possibility of ozone depletion, it has been suggested that significant concentrations of halocarbon refrigerants in the atmosphere might contribute to global warming (the so-called greenhouse effect). It is desirable, therefore, to use refrigerants which have relatively short atmospheric lifetimes as a result of their ability to react with other atmospheric constituents such as hydroxyl radicals or as a result of ready degradation through photolytic processes.

R-410A and R-407 refrigerants (including R-407A, R-407B and R-407C) have been introduced as a replacement refrigerant for R-22. However, R-22, R-410A and the R-407 refrigerants all have a high global warming potential (GWP, also known as greenhouse warming potential).

1,1,1,2-tetrafluoroethane (refrigerant R-134a) was introduced as a replacement refrigerant for R-12. However, despite having no significant ozone depletion potential, R-134a has a GWP of 1300. It would be desirable to find replacements for R-134a that have a lower GWP.

R-152a (1,1-difluoroethane) has been identified as an alternative to R-134a. It is somewhat more efficient than R-134a and has a greenhouse warming potential of 120. However the flammability of R-152a is judged too high, for example to permit its safe use in mobile air conditioning systems. In particular it is believed that its lower flammable limit in air is too low, its flame speeds are too high, and its ignition energy is too low.

Thus there is a need to provide alternative refrigerants having improved properties such as low flammability. Fluorocarbon combustion chemistry is complex and unpredictable. It is not always the case that mixing a non-flammable fluorocarbon with a flammable fluorocarbon reduces the flammability of the fluid or reduces the range of flammable compositions in air. For example, the inventors have found that if non-flammable R-134a is mixed with flammable R-152a, the lower flammable limit of the mixture alters in a manner which is not predictable. The situation is rendered even more complex and less predictable if ternary compositions are considered.

There is also a need to provide alternative refrigerants that may be used in existing devices such as refrigeration devices with little or no modification.

R-1234yf (2,3,3,3-tetrafluoropropene) has been identified as a candidate alternative refrigerant to replace R-134a in certain applications, notably the mobile air conditioning or heat pumping applications. Its GWP is about 4. R-1234yf is flammable but its flammability characteristics are generally regarded as acceptable for some applications including mobile air conditioning or heat pumping. In particular, when compared with R-152a, its lower flammable limit is higher, its minimum ignition energy is higher and the flame speed in air is significantly lower than that of R-152a.

The environmental impact of operating an air conditioning or refrigeration system, in terms of the emissions of greenhouse gases, should be considered with reference not only to the so-called "direct" GWP of the refrigerant, but also with reference to the so-called "indirect" emissions, meaning those emissions of carbon dioxide resulting from consumption of electricity or fuel to operate the system. Several metrics of this total GWP impact have been developed, including those known as Total Equivalent Warming Impact (TEWI) analysis, or Life-Cycle Carbon Production (LCCP) analysis. Both of these measures include estimation of the effect of refrigerant GWP and energy efficiency on overall warming impact.

The energy efficiency and refrigeration capacity of R-1234yf have been found to be significantly lower than those of R-134a and in addition the fluid has been found to exhibit increased pressure drop in system pipework and heat exchangers. A consequence of this is that to use R-1234yf and achieve energy efficiency and cooling performance equivalent to R-134a, increased complexity of equipment and increased size of pipework is required, leading to an increase in indirect emissions associated with equipment. Furthermore, the production of R-1234yf is thought to be more complex and less efficient in its use of raw materials (fluorinated and chlorinated) than R-134a. So the adoption of R-1234yf to replace R-134a will consume more raw materials and result in more indirect emissions of greenhouse gases than does R-134a.

Some existing technologies designed for R-134a may not be able to accept even the reduced flammability of some heat transfer compositions (any composition having a GWP of less than 150 is believed to be flammable to some extent).

A principal object of the present invention is therefore to provide a heat transfer composition which is usable in its own right or suitable as a replacement for existing refrigeration usages which should have a reduced GWP, yet have a capacity and energy efficiency (which may be conveniently expressed as the "Coefficient of Performance") ideally within 10% of the values, for example of those attained using existing refrigerants (e.g. R-134a, R-152a, R-1234yf, R-22, R-410A, R-407A, R-407B, R-407C, R507 and R-404a), and preferably within less than 10% (e.g. about 5%) of these values. It is known in the art that differences of this order between fluids are usually resolvable by redesign of equipment and system operational features. The composition should also ideally have reduced toxicity and acceptable flammability.

SUMMARY

The subject invention addresses the above deficiencies by the provision of a heat transfer composition consisting essentially of from about 62 to about 78% by weight trans-1,3,3,3-tetrafluoropropene (R-1234ze(E)) and from about 22 to about 38% by weight of 1,1-difluoroethane (R-152a). These will be referred to hereinafter as the binary compositions of the invention, unless otherwise stated.

By the term "consist essentially of", we mean that the compositions of the invention contain substantially no other components, particularly no further (hydro)(fluoro) compounds (e.g. (hydro)(fluoro)alkanes or (hydro)(fluoro)alkenes) known to be used in heat transfer compositions. We include the term "consist of" within the meaning of "consist essentially of".

All of the chemicals herein described are commercially available. For example, the fluorochemicals may be obtained from Apollo Scientific (UK).

As used herein, all % amounts mentioned in compositions herein, including in the claims, are by weight based on the total weight of the compositions, unless otherwise stated.

In a preferred embodiment, the binary compositions of the invention consist essentially of from about 63 to about 77% by weight of R-1234ze(E) and from about 23 to about 37% by weight of R-152a, or from about 64 to about 76% by weight of R-1234ze(E) and from about 24 to about 36% by weight of R-152a.

Conveniently, the binary compositions of the invention may consist essentially of from about 65 to about 75% by weight of R-1234ze(E) and from about 25 to about 35% by weight of R-152a, or from about 66 to about 74% by weight of R-1234ze(E) and from about 26 to about 34% by weight of R-152a.

Advantageously, the binary compositions of the invention may consist essentially of from about 67 to about 73% by weight of R-1234ze(E) and from about 27 to about 33% by weight of R-152a, or from about 68 to about 72% by weight of R-1234ze(E) and from about 28 to about 32% by weight of R-152a.

For the avoidance of doubt, it is to be understood that the upper and lower values for ranges of amounts of components in the binary compositions of the invention may be interchanged in any way, provided that the resulting ranges fall within the broadest scope of the invention. For example, a binary composition of the invention may consist essentially of from about 62 to about 75% by weight of R-1234ze(E) and from about 25 to about 38% by weight of R-152a, or from about 66 to about 77% by weight of R-1234ze(E) and from about 23 to about 34% by weight of R-152a.

In another embodiment, the compositions of the invention from about 20 to about 40% by weight R-152a, from about 5 to about 55% R-134a, and from about 5 to about 75% by weight R-1234ze(E). These will be referred to herein as the (ternary) compositions of the invention.

The R-134a typically is included to reduce the flammability of the compositions of the invention, both in the liquid and vapour phases. Preferably, sufficient R-134a is included to render the compositions of the invention non-flammable.

Preferred compositions of the invention comprise from about 22 to about 38% by weight R-152a, from about 10 to about 50% R-134a, and from about 10 to about 70% by weight R-1234ze(E).

Advantageous compositions of the invention comprise from about 22 to about 38% by weight R-152a, from about 20 to about 50% R-134a, and from about 10 to about 60% by weight R-1234ze(E).

Further preferred compositions of the invention comprise from about 28 to about 38% by weight R-152a, from about 15 to about 50% R-134a, and from about 10 to about 60% by weight R-1234ze(E).

Further advantageous compositions of the invention comprise from about 31 to about 38% by weight R-152a, from about 10 to about 50% R-134a, and from about 10 to about 60% by weight R-1234ze(E).

Preferably, the compositions of the invention which contain R-134a are non-flammable at a test temperature of 60° C. using the ASHRAE 34 methodology.

The compositions of the invention containing R-1234ze(E), R-152a and R-134a may consist essentially (or consist of) these components.

For the avoidance of doubt, any of the ternary compositions of the invention described herein, including those with specifically defined amounts of components, may consist essentially of (or consist of) the components defined in those compositions.

BRIEF DESCRIPTION OF THE DRAWINGS

FIG. 1 is a chart with the vertices representing pure air, fuel and diluent with the point on the interior of the triangle representing mixtures of air, fuel and diluent.

DETAILED DESCRIPTION

Compositions according to the invention conveniently comprise substantially no R-1225 (pentafluoropropene), conveniently substantially no R-1225ye (1,2,3,3,3-pentafluoropropene) or R-1225zc (1,1,3,3,3-pentafluoropropene), which compounds may have associated toxicity issues.

By "substantially no", we include the meaning that the compositions of the invention contain 0.5% by weight or less of the stated component, preferably 0.1% or less, based on the total weight of the composition.

The compositions of the invention may contain substantially no:
(i) 2,3,3,3-tetrafluoropropene (R-1234yf),
(ii) cis-1,3,3,3-tetrafluoropropene (R-1234ze(Z)), and/or
(iii) 3,3,3-tetrafluoropropene (R-1243zf).

The compositions of the invention have zero ozone depletion potential.

Preferably, the compositions of the invention (e.g. those that are suitable refrigerant replacements for R-134a, R-1234yf or R-152a) have a GWP that is less than 1300, preferably less than 1000, more preferably less than 500, 400, 300 or 200, especially less than 150 or 100, even less than 50 in some cases. Unless otherwise stated, IPCC (Intergovernmental Panel on Climate Change) TAR (Third Assessment Report) values of GWP have been used herein.

Advantageously, the compositions are of reduced flammability hazard when compared to the individual flammable components of the compositions, e.g. R-152a. Preferably, the compositions are of reduced flammability hazard when compared to R-1234yf.

In one aspect, the compositions have one or more of (a) a higher lower flammable limit; (b) a higher ignition energy; or (c) a lower flame velocity compared to R-152a or R-1234yf.

Flammability may be determined in accordance with ASHRAE Standard 34 incorporating the ASTM Standard E-681 with test methodology as per Addendum 34p dated 2004, the entire content of which is incorporated herein by reference.

In some applications it may not be necessary for the formulation to be classed as non-flammable by the ASHRAE 34 methodology; it is possible to develop fluids whose flammability limits will be sufficiently reduced in air to render them safe for use in the application, for example if it is physically not possible to make a flammable mixture by leaking the refrigeration equipment charge into the surrounds. We have found that the effect of adding R-1234ze(E) to flammable refrigerant R-152a is to modify the flammability in mixtures with air in this manner.

It is known that the flammability of mixtures of hydrofluorocarbons, (HFCs) or hydrofluorocarbons plus hydrofluoroolefins, is related to the proportion of carbon-fluorine bonds relative to carbon-hydrogen bonds. This can be expressed as the ratio $R=F/(F+H)$ where, on a molar basis, F represents the total number of fluorine atoms and H represents the total number of hydrogen atoms in the composition. This is referred to herein as the fluorine ratio, unless otherwise stated.

For example, Takizawa et al, *Reaction Stoichiometry for Combustion of Fluoroethane Blends*, ASHRAE Transactions 112(2) 2006 (which is incorporated herein by reference), shows there exists a near-linear relationship between this ratio and the flame speed of mixtures comprising R-152a, with increasing fluorine ratio resulting in lower flame speeds. The data in this reference teach that the fluorine ratio needs to be greater than about 0.65 for the flame speed to drop to zero, in other words, for the mixture to be non-flammable.

Similarly, Minor et al (Du Pont Patent Application WO2007/053697) provide teaching on the flammability of many hydrofluoroolefins, showing that such compounds could be expected to be non-flammable if the fluorine ratio is greater than about 0.7.

It may be expected on the basis of the art, therefore, that mixtures comprising R-152a (fluorine ratio 0.33) and R-1234ze(E) (fluorine ratio 0.67) would be flammable except for limited compositional ranges comprising almost 100% R-1234ze(E), since any amount of R-152a added to the olefin would reduce the fluorine ratio of the mixture below 0.67.

Surprisingly, we have found this not to be the case. In particular, we have found that mixtures comprising R-152a and R-1234ze(E) having a fluorine ratio of less than 0.7 exist that are non-flammable at 23° C. As shown in the examples hereinafter, mixtures of R-152a and R-1234ze(E) are non-flammable even down to fluorine ratios of about 0.58.

Moreover, again as demonstrated in the examples hereinafter, we have further identified mixtures of R-152a and R-1234ze(E) having a lower flammable limit in air of 7% v/v or higher (thereby making them safe to use in many applications), and having a fluorine ratio as low as about 0.43. This is especially surprising given that flammable 2,3,3,3-tetrafluoropropene (R-1234yf) has a fluorine ratio of 0.67 and a measured lower flammable limit in air at 23 C of 6 to 6.5% v/v.

In one embodiment, the compositions of the invention have a fluorine ratio of from about 0.48 to about 0.57, such as from about 0.49 to about 0.56, for example from about 0.50 to about 0.55. For the avoidance of doubt, it is to be understood that the upper and lower values of these fluorine ratio ranges may be interchanged in any way, provided that the resulting ranges fall within the broadest scope of the invention.

By producing low-flammabilty R-152a/R-1234ze(E) blends containing less than expected amounts of R-1234ze (E), the amounts of R-152a in such compositions is increased. This is believed to result in heat transfer compositions exhibiting, for example, increased cooling capacity, decreased temperature glide and/or decreased pressure drop, compared to equivalent compositions containing higher amounts of R-1234ze(E).

Thus, the compositions of the invention exhibit a completely unexpected combination of low-flammability, low GWP and improved refrigeration performance properties. Some of these refrigeration performance properties are explained in more detail below.

Temperature glide, which can be thought of as the difference between bubble point and dew point temperatures of a zeotropic (non-azeotropic) mixture at constant pressure, is a characteristic of a refrigerant; if it is desired to replace a fluid with a mixture then it is often preferable to have similar or reduced glide in the alternative fluid. In an embodiment, the compositions of the invention are zeotropic.

Conveniently, the temperature glide (in the evaporator) of the compositions of the invention is less than about 2K, preferably less than about 1K.

Advantageously, the volumetric refrigeration capacity of the compositions of the invention is at least 85% of the existing refrigerant fluid it is replacing, preferably at least 90% or even at least 95%.

The compositions of the invention typically have a volumetric refrigeration capacity that is at least 90% of that of R-1234yf. Preferably, the compositions of the invention have a volumetric refrigeration capacity that is at least 95% of that of R-1234yf, for example from about 95% to about 120% of that of R-1234yf.

In one embodiment, the cycle efficiency (Coefficient of Performance, COP) of the compositions of the invention is within about 5% or even better than the existing refrigerant fluid it is replacing Conveniently, the compressor discharge temperature of the compositions of the invention is within about 15K of the existing refrigerant fluid it is replacing, preferably about 10K or even about 5K.

The compositions of the invention preferably have energy efficiency at least 95% (preferably at least 98%) of R-134a under equivalent conditions, while having reduced or equivalent pressure drop characteristic and cooling capacity at 95% or higher of R-134a values. Advantageously the compositions have higher energy efficiency and lower pressure drop characteristics than R-134a under equivalent conditions. The compositions also advantageously have better energy efficiency and pressure drop characteristics than R-1234yf alone.

The heat transfer compositions of the invention are suitable for use in existing designs of equipment, and are compatible with all classes of lubricant currently used with established HFC refrigerants. They may be optionally stabilized or compatibilized with mineral oils by the use of appropriate additives.

Preferably, when used in heat transfer equipment, the composition of the invention is combined with a lubricant.

Conveniently, the lubricant is selected from the group consisting of mineral oil, silicone oil, polyalkyl benzenes (PABs), polyol esters (POEs), polyalkylene glycols (PAGs), polyalkylene glycol esters (PAG esters), polyvinyl ethers (PVEs), poly (alpha-olefins) and combinations thereof.

Advantageously, the lubricant further comprises a stabiliser.

Preferably, the stabiliser is selected from the group consisting of diene-based compounds, phosphates, phenol compounds and epoxides, and mixtures thereof.

Conveniently, the composition of the invention may be combined with a flame retardant.

Advantageously, the flame retardant is selected from the group consisting of tri-(2-chloroethyl)-phosphate, (chloropropyl)phosphate, tri-(2,3-dibromopropyl)-phosphate, tri-(1,3-dichloropropyl)-phosphate, diammonium phosphate, various halogenated aromatic compounds, antimony oxide, aluminium trihydrate, polyvinyl chloride, a fluorinated iodocarbon, a fluorinated bromocarbon, trifluoro iodomethane, perfluoroalkyl amines, bromo-fluoroalkyl amines and mixtures thereof.

Preferably, the heat transfer composition is a refrigerant composition.

In one embodiment, the invention provides a heat transfer device comprising a composition of the invention.

Preferably, the heat transfer device is a refrigeration device.

Conveniently, the heat transfer device is selected from group consisting of automotive air conditioning systems, residential air conditioning systems, commercial air conditioning systems, residential refrigerator systems, residential freezer systems, commercial refrigerator systems, commercial freezer systems, chiller air conditioning systems, chiller refrigeration systems, and commercial or residential heat pump systems. Preferably, the heat transfer device is a refrigeration device or an air-conditioning system.

Advantageously, the heat transfer device contains a centrifugal-type compressor.

The invention also provides the use of a composition of the invention in a heat transfer device as herein described.

According to a further aspect of the invention, there is provided a blowing agent comprising a composition of the invention.

According to another aspect of the invention, there is provided a foamable composition comprising one or more components capable of forming foam and a composition of the invention.

Preferably, the one or more components capable of forming foam are selected from polyurethanes, thermoplastic polymers and resins, such as polystyrene, and epoxy resins.

According to a further aspect of the invention, there is provided a foam obtainable from the foamable composition of the invention.

Preferably the foam comprises a composition of the invention.

According to another aspect of the invention, there is provided a sprayable composition comprising a material to be sprayed and a propellant comprising a composition of the invention.

According to a further aspect of the invention, there is provided a method for cooling an article which comprises condensing a composition of the invention and thereafter evaporating said composition in the vicinity of the article to be cooled.

According to another aspect of the invention, there is provided a method for heating an article which comprises condensing a composition of the invention in the vicinity of the article to be heated and thereafter evaporating said composition.

According to a further aspect of the invention, there is provided a method for extracting a substance from biomass comprising contacting the biomass with a solvent comprising a composition of the invention, and separating the substance from the solvent.

According to another aspect of the invention, there is provided a method of cleaning an article comprising contacting the article with a solvent comprising a composition of the invention.

According to a further aspect of the invention, there is provided a method for extracting a material from an aqueous solution comprising contacting the aqueous solution with a solvent comprising a composition of the invention, and separating the material from the solvent.

According to another aspect of the invention, there is provided a method for extracting a material from a particulate solid matrix comprising contacting the particulate solid matrix with a solvent comprising a composition of the invention, and separating the material from the solvent.

According to a further aspect of the invention, there is provided a mechanical power generation device containing a composition of the invention.

Preferably, the mechanical power generation device is adapted to use a Rankine Cycle or modification thereof to generate work from heat.

According to another aspect of the invention, there is provided a method of retrofitting a heat transfer device comprising the step of removing an existing heat transfer fluid, and introducing a composition of the invention. Preferably, the heat transfer device is a refrigeration device or (a static) air conditioning system. Advantageously, the method further comprises the step of obtaining an allocation of greenhouse gas (e.g. carbon dioxide) emission credit.

In accordance with the retrofitting method described above, an existing heat transfer fluid can be fully removed from the heat transfer device before introducing a composition of the invention. An existing heat transfer fluid can also be partially removed from a heat transfer device, followed by introducing a composition of the invention.

In another embodiment wherein the existing heat transfer fluid is R-134a, and the composition of the invention contains R134a, R-1234ze(E) and R-152a (and optional components as a lubricant, a stabiliser or a flame retardant), R-1234ze(E), R-152a, etc, can be added to the R-134a in the heat transfer device, thereby forming the compositions of the invention, and the heat transfer device of the invention, in situ. Some of the existing R-134a may be removed from the heat transfer device prior to adding the R-1234ze(E), R-152a, etc to facilitate providing the components of the compositions of the invention in the desired proportions.

Thus, the invention provides a method for preparing a composition and/or heat transfer device of the invention comprising introducing R-1234ze(E) and R-152a, and optional components such as a lubricant, a stabiliser or a flame retardant, into a heat transfer device containing an existing heat transfer fluid which is R-134a. Optionally, at least some of the R-134a is removed from the heat transfer device before introducing the R-1234ze(E), R-152a, etc.

Of course, the compositions of the invention may also be prepared simply by mixing the R-1234ze(E) and R-152a, optionally R-134a (and optional components such as a lubricant, a stabiliser or an additional flame retardant) in the desired proportions. The compositions can then be added to a heat transfer device (or used in any other way as defined herein) that does not contain R-134a or any other existing heat transfer fluid, such as a device from which R-134a or any other existing heat transfer fluid have been removed.

In a further aspect of the invention, there is provided a method for reducing the environmental impact arising from operation of a product comprising an existing compound or composition, the method comprising replacing at least partially the existing compound or composition with a composition of the invention. Preferably, this method comprises the step of obtaining an allocation of greenhouse gas emission credit.

By environmental impact we include the generation and emission of greenhouse warming gases through operation of the product.

As mentioned above, this environmental impact can be considered as including not only those emissions of compounds or compositions having a significant environmental impact from leakage or other losses, but also including the emission of carbon dioxide arising from the energy consumed by the device over its working life. Such environmental impact may be quantified by the measure known as Total Equivalent Warming Impact (TEWI). This measure has been used in quantification of the environmental impact of certain stationary refrigeration and air conditioning equipment, including for example supermarket refrigeration systems (see, for example, http://en.wikipedia.org/wiki/Total_equivalent_warming_impact).

The environmental impact may further be considered as including the emissions of greenhouse gases arising from the synthesis and manufacture of the compounds or compositions. In this case the manufacturing emissions are added to the energy consumption and direct loss effects to yield the measure known as Life-Cycle Carbon Production (LCCP, see for example http://www.sae.org/events/aars/presentations/2007papasavva.pdf). The use of LCCP is common in assessing environmental impact of automotive air conditioning systems.

Emission credit(s) are awarded for reducing pollutant emissions that contribute to global warming and may, for example, be banked, traded or sold. They are conventionally expressed in the equivalent amount of carbon dioxide. Thus if the emission of 1 kg of R-134a is avoided then an emission credit of 1×1300=1300 kg $CO_2$ equivalent may be awarded.

In another embodiment of the invention, there is provided a method for generating greenhouse gas emission credit(s) comprising (i) replacing an existing compound or composition with a composition of the invention, wherein the composition of the invention has a lower GWP than the existing compound or composition; and (ii) obtaining greenhouse gas emission credit for said replacing step.

In a preferred embodiment, the use of the composition of the invention results in the equipment having a lower Total Equivalent Warming Impact, and/or a lower Life-Cycle Carbon Production than that which would be attained by use of the existing compound or composition.

These methods may be carried out on any suitable product, for example in the fields of air-conditioning, refrigeration (e.g. low and medium temperature refrigeration), heat transfer, blowing agents, aerosols or sprayable propellants, gaseous dielectrics, cryosurgery, veterinary procedures, dental procedures, fire extinguishing, flame suppression, solvents (e.g. carriers for flavorings and fragrances), cleaners, air horns, pellet guns, topical anesthetics, and expansion applications. Preferably, the field is air-conditioning or refrigeration.

Examples of suitable products include a heat transfer devices, blowing agents, foamable compositions, sprayable compositions, solvents and mechanical power generation devices. In a preferred embodiment, the product is a heat transfer device, such as a refrigeration device or an air-conditioning unit.

The existing compound or composition has an environmental impact as measured by GWP and/or TEWI and/or LCCP that is higher than the composition of the invention which replaces it. The existing compound or composition may comprise a fluorocarbon compound, such as a perfluoro-, hydrofluoro-, chlorofluoro- or hydrochlorofluoro-carbon compound or it may comprise a fluorinated olefin Preferably, the existing compound or composition is a heat transfer compound or composition such as a refrigerant. Examples of refrigerants that may be replaced include R-134a, R-152a, R-1234yf, R-410A, R-407A, R-407B, R-407C, R507, R-22 and R-404A. The compositions of the invention are particularly suited as replacements for R-134a, R-152a or R-1234yf.

Any amount of the existing compound or composition may be replaced so as to reduce the environmental impact. This may depend on the environmental impact of the existing compound or composition being replaced and the environmental impact of the replacement composition of the invention. Preferably, the existing compound or composition in the product is fully replaced by the composition of the invention.

The invention is illustrated by the following non-limiting examples.

Examples

The flammability of R-152a in air at atmospheric pressure and controlled humidity was studied in a test flask apparatus as described by the methodology of ASHRAE standard 34. The test temperature used was 23° C.; the humidity was controlled to be 50% relative to a standard temperature of 77° F. (25° C.). The diluent used was R-1234ze(E), which was found to be non flammable under these test conditions. The fuel and diluent gases were subjected to vacuum purging of the cylinder to remove dissolved air or other inert gases prior to testing.

The results of this testing are shown in FIG. 1, where the vertices of the chart represent pure air, fuel and diluent. Points on the interior of the triangle represent mixtures of air, fuel and diluent. The flammable region of such mixtures was found by experimentation and is enclosed by the curved line.

It was found that binary mixtures of R-152a and R-1234ze(E) containing at least 70% v/v (about 80% w/w) R-1234ze(E) were non-flammable when mixed with air in all proportions. This is shown by the solid line on the diagram, which is a tangent to the flammable region and represents the mixing line of air with a fuel/diluent mixture in the proportions 70% v/v diluent to 30% v/v fuel.

It was further found that binary mixtures of R-152a and R-1234ze(E) containing at least 37% v/v (about 50% w/w) R-1234ze(E) had reduced flammability hazard (as measured by lower flammable limit) when compared with R-1234yf. The dashed line on the diagram shows that a fuel/diluent mixture in the proportions 37% v/v diluent to 63% v/v fuel has a lower flammable limit in air of 7% v/v. By way of comparison the lower flammable limit of R-1234yf in air in the same test apparatus and at the same temperature was found to be variously between 6.0 and 6.5% v/v in several repeated tests.

We have identified the following mixtures of R-152a and R-1234ze(E) having a lower flammable limit in air of at least 7% v/v.

| Mixture composition v/v (volumetric basis) | Fluorine ratio R = F/(F + H) | Lower flammable limit at 23° C. (% v/v) | Composition on a weight/weight basis |
|---|---|---|---|
| R-152a 68%, R-1234ze(E) 32% | 0.44 | 7.0% | R-152a 55%, R-1234ze(E) 45% |
| R-152a 60% R-1234ze(E) 40% | 0.467 | 8% | R-152a 46.5% R-1234ze(E) 53.5% |
| R-152a 49%, R-1234ze(E) 51% | 0.503 | 10% | R-152a 35.8%, R-1234ze(E) 64.2% |
| R-152a 41%, R-1234ze(E) 59% | 0.53 | 12% | R-152a 28.7%, R-1234ze(E) 71.3% |
| R-152a 35%, R-1234ze(E) 65% | 0.55 | 14% | R-152a 23.8%, R-1234ze(E) 76.2% |

The above table shows that we have found that it is possible to generate mixtures comprising R-161 and R-1234ze(E) having an LFL of 7% v/v or higher if the fluorine ratio of the mixture is greater than about 0.44.

Performance of R-152a/R-1234ze and R-152a/R-1234ze/R-134a Blends

The performance of selected binary and ternary compositions of the invention was estimated using a thermodynamic property model in conjunction with an idealised vapour compression cycle. The thermodynamic model used the Peng Robinson equation of state to represent vapour phase properties and vapour-liquid equilibrium of the mixtures, together with a polynomial correlation of the variation of ideal gas enthalpy of each component of the mixtures with temperature. The principles behind use of this equation of state to model thermodynamic properties and vapour liquid equilibrium are explained more fully in *The Properties of Gases and Liquids* (5$^{th}$ edition) by B E Poling, J M Prausnitz and J M O'Connell pub. McGraw Hill 2000, in particular Chapters 4 and 8 (which is incorporated herein by reference).

The basic property data required to use this model were: critical temperature and critical pressure; vapour pressure and the related property of Pitzer acentric factor; ideal gas enthalpy, and measured vapour liquid equilibrium data for the binary system R-152a/R-1234ze(E).

The basic property data (critical properties, acentric factor, vapour pressure and ideal gas enthalpy) for R-152a were derived from literature sources including: NIST REFPROP 8.0 (which is incorporated herein by reference). The critical point and vapour pressure for R-1234ze(E) were measured experimentally. The ideal gas enthalpy for R-1234ze(E) over a range of temperatures was estimated using the molecular modelling software Hyperchem 7.5, which is incorporated herein by reference.

Vapour liquid equilibrium data for the binary mixture was regressed to the Peng Robinson equation using a binary interaction constant incorporated into van der Waal's mixing rules as follows. Vapour liquid equilibrium data for R-152a with R-1234ze(E) was modelled by using the equation of state with van der Waals mixing rules and fitting the interaction constant to replicate an azeotropic composition of approximately 28% w/w R-1234ze(E) at a temperature of −25° C.

The refrigeration performance of selected compositions of the invention were modelled using the following cycle conditions.

| | |
|---|---|
| Condensing temperature (° C.) | 60 |
| Evaporating temperature (° C.) | 0 |
| Subcool (K) | 5 |
| Superheat (K) | 5 |
| Suction temperature (° C.) | 15 |
| Isentropic efficiency | 65% |
| Clearance ratio | 4% |
| Duty (kW) | 6 |
| Suction line diameter (mm) | 16.2 |

The refrigeration performance data of these compositions are set out in the following tables.

The performance of the compositions of the invention show close capacity match to R-1234yf and in some cases exceed the cooling capacity of that fluid, coming close to the capacity of R-134a. The energy efficiency (expressed as COP) of the compositions is significantly higher than for R-1234yf and approaches that of R-134a. The pressure drop in the suction gas line is significantly lower than that expected from R-1234yf, which is of particular benefit for automotive air conditioning or heat pumping systems.

TABLE 1

Theoretical Performance Data of R-152a/R-1234ze(E) Compositions of the Invention Containing 22-30% R-152a

| | | | | | | | | |
|---|---|---|---|---|---|---|---|---|
| R-152a (% b/w) | | | | | | 22 | 23 | 24 | 25 |
| R-1234ze(E) (% b/w) | | | | | | 78 | 77 | 76 | 75 |
| | | COMPARATIVE DATA | | | | | | |
| Calculation results | | 134a | R1234yf | R1234ze(E) | 22/78 | 23/77 | 24/76 | 25/75 |
| Pressure ratio | | 5.79 | 5.24 | 5.75 | 5.68 | 5.68 | 5.68 | 5.67 |
| Volumetric efficiency | | 83.6% | 84.7% | 82.8% | 83.7% | 83.7% | 83.8% | 83.8% |
| condenser glide | K | 0.0 | 0.0 | 0.0 | 0.4 | 0.4 | 0.4 | 0.4 |
| Evaporator glide | K | 0.0 | 0.0 | 0.0 | 0.3 | 0.3 | 0.3 | 0.3 |
| Evaporator inlet temperature | ° C. | 0.0 | 0.0 | 0.0 | −0.1 | −0.1 | −0.1 | −0.1 |
| Condenser exit temperature | ° C. | 55.0 | 55.0 | 55.0 | 54.8 | 54.8 | 54.8 | 54.8 |
| Condenser pressure | bar | 16.88 | 16.46 | 12.38 | 13.68 | 13.72 | 13.76 | 13.81 |

TABLE 1-continued

Theoretical Performance Data of R-152a/R-1234ze(E) Compositions of the Invention Containing 22-30% R-152a

| | | | | | | | | |
|---|---|---|---|---|---|---|---|---|
| Evaporator pressure | bar | 2.92 | 3.14 | 2.15 | 2.41 | 2.42 | 2.42 | 2.43 |
| Refrigeration effect | kJ/kg | 123.76 | 94.99 | 108.63 | 129.49 | 130.46 | 131.44 | 132.42 |
| COP | | 2.03 | 1.91 | 2.01 | 2.06 | 2.06 | 2.07 | 2.07 |
| Discharge temperature | °C. | 99.15 | 92.88 | 86.66 | 94.06 | 94.38 | 94.69 | 95.01 |
| Mass flow rate | kg/hr | 174.53 | 227.39 | 198.83 | 166.80 | 165.56 | 164.34 | 163.12 |
| Volumetric flow rate | m3/hr | 13.16 | 14.03 | 18.29 | 15.90 | 15.82 | 15.75 | 15.67 |
| Volumetric capacity | kJ/m$^3$ | 1641 | 1540 | 1181 | 1358 | 1365 | 1372 | 1378 |
| Pressure drop | kPa/m | 953 | 1239 | 1461 | 1113 | 1101 | 1090 | 1079 |
| GWP (TAR) | | | | 6 | 31 | 32 | 33 | 35 |
| F/(F + H) | | | | 0.667 | 0.558 | 0.553 | 0.549 | 0.545 |
| Capacity relative to 1234yf | | 106.6% | 100.0% | 76.7% | 88.2% | 88.7% | 89.1% | 89.5% |
| Relative COP | | 106.0% | 100.0% | 105.3% | 107.8% | 107.9% | 108.0% | 108.1% |
| Relative pressure drop | | 76.9% | 100.0% | 117.9% | 89.8% | 88.9% | 88.0% | 87.1% |

| | | | | | | |
|---|---|---|---|---|---|---|
| | R-152a (% b/w) | 26 | 27 | 28 | 29 | 30 |
| | R-1234ze(E) (% b/w) | 74 | 73 | 72 | 71 | 70 |
| | Calculation results | 26/74 | 27/73 | 28/72 | 29/71 | 30/70 |
| | Pressure ratio | 5.67 | 5.67 | 5.67 | 5.67 | 5.67 |
| | Volumetric efficiency | 83.8% | 83.9% | 83.9% | 84.0% | 84.0% |
| condenser glide | K | 0.4 | 0.4 | 0.4 | 0.4 | 0.4 |
| Evaporator glide | K | 0.3 | 0.3 | 0.3 | 0.3 | 0.3 |
| Evaporator inlet temperature | °C. | −0.1 | −0.1 | −0.1 | −0.1 | −0.1 |
| Condenser exit temperature | °C. | 54.8 | 54.8 | 54.8 | 54.8 | 54.8 |
| Condenser pressure | bar | 13.85 | 13.89 | 13.93 | 13.97 | 14.01 |
| Evaporator pressure | bar | 2.44 | 2.45 | 2.46 | 2.47 | 2.47 |
| Refrigeration effect | kJ/kg | 133.40 | 134.38 | 135.36 | 136.35 | 137.34 |
| COP | | 2.07 | 2.07 | 2.07 | 2.08 | 2.08 |
| Discharge temperature | °C. | 95.33 | 95.64 | 95.96 | 96.27 | 96.58 |
| Mass flow rate | kg/hr | 161.92 | 160.74 | 159.57 | 158.41 | 157.27 |
| Volumetric flow rate | m3/hr | 15.60 | 15.53 | 15.46 | 15.39 | 15.32 |
| Volumetric capacity | kJ/m$^3$ | 1385 | 1391 | 1397 | 1404 | 1410 |
| Pressure drop | kPa/m | 1068 | 1057 | 1047 | 1036 | 1026 |
| GWP (TAR) | | 36 | 37 | 38 | 39 | 40 |
| F/(F + H) | | 0.541 | 0.537 | 0.533 | 0.529 | 0.525 |
| Capacity relative to 1234yf | | 89.9% | 90.4% | 90.8% | 91.2% | 91.6% |
| Relative COP | | 108.2% | 108.3% | 108.4% | 108.5% | 108.6% |
| Relative pressure drop | | 86.2% | 85.3% | 84.5% | 83.6% | 82.8% |

TABLE 2

Theoretical Performance Data of R-152a/R-1234ze(E) Compositions of the Invention Containing 31-38% R-152a

| | | | | | | |
|---|---|---|---|---|---|---|
| R-152a (% b/w) | | | | 31 | 32 | 33 |
| R-1234ze(E) (% b/w) | | | | 69 | 68 | 67 |

| | | COMPARATIVE DATA | | | | |
|---|---|---|---|---|---|---|
| Calculation results | | 134a | R1234yf | R1234ze(E) | 31/69 | 32/68 | 33/67 |
| Pressure ratio | | 5.79 | 5.24 | 5.75 | 5.66 | 5.66 | 5.66 |
| Volumetric efficiency | | 83.6% | 84.7% | 82.8% | 84.0% | 84.1% | 84.1% |
| condenser glide | K | 0.0 | 0.0 | 0.0 | 0.4 | 0.4 | 0.4 |
| Evaporator glide | K | 0.0 | 0.0 | 0.0 | 0.3 | 0.2 | 0.2 |
| Evaporator inlet temperature | °C. | 0.0 | 0.0 | 0.0 | −0.1 | −0.1 | −0.1 |
| Condenser exit temperature | °C. | 55.0 | 55.0 | 55.0 | 54.8 | 54.8 | 54.8 |
| Condenser pressure | bar | 16.88 | 16.46 | 12.38 | 14.04 | 14.08 | 14.12 |
| Evaporator pressure | bar | 2.92 | 3.14 | 2.15 | 2.48 | 2.49 | 2.49 |
| Refrigeration effect | kJ/kg | 123.76 | 94.99 | 108.63 | 138.34 | 139.34 | 140.34 |
| COP | | 2.03 | 1.91 | 2.01 | 2.08 | 2.08 | 2.08 |
| Discharge temperature | °C. | 99.15 | 92.88 | 86.66 | 96.89 | 97.20 | 97.51 |

TABLE 2-continued

Theoretical Performance Data of R-152a/R-1234ze(E) Compositions of the Invention Containing 31-38% R-152a

| | | | | | | |
|---|---|---|---|---|---|---|
| Mass flow rate | kg/hr | 174.53 | 227.39 | 198.83 | 156.14 | 155.02 | 153.91 |
| Volumetric flow rate | m3/hr | 13.16 | 14.03 | 18.29 | 15.26 | 15.20 | 15.14 |
| Volumetric capacity | kJ/m$^3$ | 1641 | 1540 | 1181 | 1416 | 1421 | 1427 |
| Pressure drop | kPa/m | 953 | 1239 | 1461 | 1017 | 1007 | 998 |
| GWP (TAR) | | | | 6 | 41 | 42 | 44 |
| F/(F + H) | | | | 0.667 | 0.521 | 0.517 | 0.513 |
| Capacity relative to 1234yf | | 106.6% | 100.0% | 76.7% | 88.2% | 88.7% | 89.1% |
| Relative COP | | 106.0% | 100.0% | 105.3% | 107.8% | 107.9% | 108.0% |
| Relative pressure drop | | 76.9% | 100.0% | 117.9% | 89.8% | 88.9% | 88.0% |

| | | | | | |
|---|---|---|---|---|---|
| R-152a (% b/w) | 34 | 35 | 36 | 37 | 38 |
| R-1234ze(E) (% b/w) | 66 | 65 | 64 | 63 | 62 |

| Calculation results | | 34/66 | 35/65 | 36/64 | 37/63 | 38/62 |
|---|---|---|---|---|---|---|
| Pressure ratio | | 5.66 | 5.66 | 5.66 | 5.66 | 5.66 |
| Volumetric efficiency | | 84.1% | 84.2% | 84.2% | 84.2% | 84.3% |
| condenser glide | K | 0.4 | 0.3 | 0.3 | 0.3 | 0.3 |
| Evaporator glide | K | 0.2 | 0.2 | 0.2 | 0.2 | 0.2 |
| Evaporator inlet temperature | °C. | −0.1 | −0.1 | −0.1 | −0.1 | −0.1 |
| Condenser exit temperature | °C. | 54.8 | 54.8 | 54.8 | 54.8 | 54.8 |
| Condenser pressure | bar | 14.15 | 14.18 | 14.22 | 14.25 | 14.28 |
| Evaporator pressure | bar | 2.50 | 2.51 | 2.51 | 2.52 | 2.53 |
| Refrigeration effect | kJ/kg | 141.34 | 142.35 | 143.36 | 144.38 | 145.39 |
| COP | | 2.08 | 2.09 | 2.09 | 2.09 | 2.09 |
| Discharge temperature | °C. | 97.82 | 98.13 | 98.44 | 98.75 | 99.06 |
| Mass flow rate | kg/hr | 152.82 | 151.74 | 150.67 | 149.61 | 148.56 |
| Volumetric flow rate | m3/hr | 15.08 | 15.02 | 14.96 | 14.91 | 14.85 |
| Volumetric capacity | kJ/m$^3$ | 1433 | 1438 | 1444 | 1449 | 1454 |
| Pressure drop | kPa/m | 988 | 979 | 970 | 962 | 953 |
| GWP (TAR) | | 45 | 46 | 47 | 48 | 49 |
| F/(F + H) | | 0.510 | 0.506 | 0.502 | 0.499 | 0.495 |
| Capacity relative to 1234yf | | 89.5% | 89.9% | 90.4% | 90.8% | 91.2% |
| Relative COP | | 108.1% | 108.2% | 108.3% | 108.4% | 108.5% |
| Relative pressure drop | | 87.1% | 86.2% | 85.3% | 84.5% | 83.6% |

TABLE 3

Theoretical Performance Data of Selected R-152a/R-1234ze(E)/R-134a Blends containing 22% b/w R-152a

| | | | | | |
|---|---|---|---|---|---|
| R-152a (% b/w) | 22 | 22 | 22 | 22 |
| R-134a (% b/w) | 10 | 15 | 20 | 25 |
| R-1234ze(E) (% b/w) | 68 | 63 | 58 | 53 |

| Calculation results | | COMPARATIVE DATA | | | | | | |
|---|---|---|---|---|---|---|---|---|
| | | 134a | R1234yf | R1234ze(E) | | | | |
| Pressure ratio | | 5.79 | 5.24 | 5.75 | 5.67 | 5.67 | 5.66 | 5.66 |
| Volumetric efficiency | | 83.6% | 84.7% | 82.8% | 83.8% | 83.8% | 83.9% | 83.9% |
| condenser glide | K | 0.0 | 0.0 | 0.0 | 0.5 | 0.5 | 0.5 | 0.5 |
| Evaporator glide | K | 0.0 | 0.0 | 0.0 | 0.3 | 0.3 | 0.3 | 0.3 |
| Evaporator inlet temperature | °C. | 0.0 | 0.0 | 0.0 | −0.2 | −0.2 | −0.2 | −0.1 |
| Condenser exit temperature | °C. | 55.0 | 55.0 | 55.0 | 54.7 | 54.7 | 54.7 | 54.8 |
| Condenser P | bar | 16.88 | 16.46 | 12.38 | 14.17 | 14.41 | 14.63 | 14.84 |
| Evaporator P | bar | 2.92 | 3.14 | 2.15 | 2.50 | 2.54 | 2.58 | 2.62 |
| Refrigeration effect | kJ/kg | 123.76 | 94.99 | 108.63 | 130.55 | 131.12 | 131.74 | 132.40 |
| COP | | 2.03 | 1.91 | 2.01 | 2.06 | 2.06 | 2.06 | 2.06 |
| Discharge T | °C. | 99.15 | 92.88 | 86.66 | 95.16 | 95.72 | 96.28 | 96.85 |
| Mass flow rate | kg/hr | 174.53 | 227.39 | 198.83 | 165.45 | 164.73 | 163.96 | 163.14 |
| Volumetric flow rate | m$^3$/hr | 13.16 | 14.03 | 18.29 | 15.33 | 15.07 | 14.83 | 14.61 |
| Volumetric capacity | kJ/m$^3$ | 1641 | 1540 | 1181 | 1409 | 1433 | 1457 | 1479 |
| Pressure drop | kPa/m | 953 | 1239 | 1461 | 1067 | 1045 | 1025 | 1006 |
| GWP (TAR BASIS) | | | | 6 | 160 | 225 | 290 | 355 |
| F/(F + H) | | | | 0.667 | 0.559 | 0.559 | 0.560 | 0.560 |
| Capacity relative to | | 106.6% | 100.0% | 76.7% | 91.5% | 93.1% | 94.6% | 96.0% |

TABLE 3-continued

Theoretical Performance Data of Selected R-152a/R-1234ze(E)/R-134a Blends containing 22% b/w R-152a

| 1234yf | | | | | | | | |
|---|---|---|---|---|---|---|---|---|
| Relative COP | | 106.0% | 100.0% | 105.3% | 107.7% | 107.7% | 107.7% | 107.7% |
| Relative pressure drop | | 76.9% | 100.0% | 117.9% | 86.1% | 84.4% | 82.7% | 81.2% |
| | R-152a (% b/w) | | | | 22 | 22 | 22 | 22 | 22 |
| | R-134a (% b/w) | | | | 30 | 35 | 40 | 45 | 50 |
| | R-1234ze(E) (% b/w) | | | | 48 | 43 | 38 | 33 | 28 |

| Calculation results | | | | | | | |
|---|---|---|---|---|---|---|---|
| Pressure ratio | | | 5.66 | 5.66 | 5.67 | 5.67 | 5.68 |
| Volumetric efficiency | | | 84.0% | 84.0% | 84.1% | 84.1% | 84.1% |
| condenser glide | K | | 0.4 | 0.4 | 0.3 | 0.3 | 0.2 |
| Evaporator glide | K | | 0.2 | 0.2 | 0.2 | 0.1 | 0.1 |
| Evaporator inlet temperature | °C. | | −0.1 | −0.1 | −0.1 | −0.1 | 0.0 |
| Condenser exit temperature | °C. | | 54.8 | 54.8 | 54.8 | 54.9 | 54.9 |
| Condenser P | bar | | 15.05 | 15.24 | 15.42 | 15.58 | 15.74 |
| Evaporator P | bar | | 2.66 | 2.69 | 2.72 | 2.75 | 2.77 |
| Refrigeration effect | kJ/kg | | 133.12 | 133.90 | 134.75 | 135.67 | 136.67 |
| COP | | | 2.06 | 2.06 | 2.06 | 2.06 | 2.06 |
| Discharge T | °C. | | 97.43 | 98.02 | 98.62 | 99.24 | 99.88 |
| Mass flow rate | kg/hr | | 162.26 | 161.32 | 160.30 | 159.21 | 158.05 |
| Volumetric flow rate | m$^3$/hr | | 14.40 | 14.21 | 14.03 | 13.86 | 13.71 |
| Volumetric capacity | kJ/m$^3$ | | 1500 | 1520 | 1540 | 1558 | 1575 |
| Pressure drop | kPa/m | | 987 | 970 | 953 | 937 | 922 |
| GWP (TAR BASIS) | | | 419 | 484 | 549 | 613 | 678 |
| F/(F + H) | | | 0.561 | 0.561 | 0.562 | 0.562 | 0.563 |
| Capacity relative to 1234yf | | | 97.4% | 98.8% | 100.0% | 101.2% | 102.3% |
| Relative COP | | | 107.7% | 107.7% | 107.7% | 107.8% | 107.9% |
| Relative pressure drop | | | 79.7% | 78.3% | 76.9% | 75.6% | 74.4% |

TABLE 4

Theoretical Performance Data of Selected R-152a/R-1234ze(E)/R-134a Blends containing 23% b/w R-152a

| R-152a (% b/w) | | | | | 23 | 23 | 23 | 23 |
|---|---|---|---|---|---|---|---|---|
| R-134a (% b/w) | | | | | 10 | 15 | 20 | 25 |
| R-1234ze(E) (% b/w) | | | | | 67 | 62 | 57 | 52 |

| Calculation results | | COMPARATIVE DATA | | | | | | |
|---|---|---|---|---|---|---|---|---|
| | | 134a | R1234yf | R1234ze(E) | | | | |
| Pressure ratio | | 5.79 | 5.24 | 5.75 | 5.67 | 5.67 | 5.66 | 5.66 |
| Volumetric efficiency | | 83.6% | 84.7% | 82.8% | 83.8% | 83.9% | 83.9% | 84.0% |
| condenser glide | K | 0.0 | 0.0 | 0.0 | 0.5 | 0.5 | 0.5 | 0.5 |
| Evaporator glide | K | 0.0 | 0.0 | 0.0 | 0.3 | 0.3 | 0.3 | 0.3 |
| Evaporator inlet temperature | °C. | 0.0 | 0.0 | 0.0 | −0.2 | −0.2 | −0.1 | −0.1 |
| Condenser exit temperature | °C. | 55.0 | 55.0 | 55.0 | 54.7 | 54.7 | 54.7 | 54.8 |
| Condenser pressure | bar | 16.88 | 16.46 | 12.38 | 14.21 | 14.44 | 14.66 | 14.87 |
| Evaporator pressure | bar | 2.92 | 3.14 | 2.15 | 2.51 | 2.55 | 2.59 | 2.63 |
| Refrigeration effect | kJ/kg | 123.76 | 94.99 | 108.63 | 131.54 | 132.13 | 132.76 | 133.43 |
| COP | | 2.03 | 1.91 | 2.01 | 2.06 | 2.06 | 2.06 | 2.06 |
| Discharge temperature | °C. | 99.15 | 92.88 | 86.66 | 95.48 | 96.04 | 96.60 | 97.17 |
| Mass flow rate | kg/hr | 174.53 | 227.39 | 198.83 | 164.21 | 163.48 | 162.71 | 161.88 |
| Volumetric flow rate | m$^3$/hr | 13.16 | 14.03 | 18.29 | 15.26 | 15.01 | 14.77 | 14.55 |
| Volumetric capacity | kJ/m$^3$ | 1641 | 1540 | 1181 | 1415 | 1439 | 1462 | 1484 |
| Pressure drop | kPa/m | 953 | 1239 | 1461 | 1056 | 1035 | 1015 | 996 |
| GWP (TAR BASIS) | | | | 6 | 162 | 226 | 291 | 356 |
| F/(F + H) | | | | 0.667 | 0.554 | 0.555 | 0.555 | 0.556 |
| Capacity relative to 1234yf | | 106.6% | 100.0% | 76.7% | 91.9% | 93.5% | 95.0% | 96.4% |
| Relative COP | | 106.0% | 100.0% | 105.3% | 107.9% | 107.8% | 107.8% | 107.8% |
| Relative pressure drop | | 76.9% | 100.0% | 117.9% | 85.2% | 83.5% | 81.9% | 80.4% |

TABLE 4-continued

Theoretical Performance Data of Selected R-152a/R-1234ze(E)/R-134a Blends containing 23% b/w R-152a

| | | | | | | | |
|---|---|---|---|---|---|---|---|
| R-152a (% b/w) | | | 23 | 23 | 23 | 23 | 23 |
| R-134a (% b/w) | | | 30 | 35 | 40 | 45 | 50 |
| R-1234ze(E) (% b/w) | | | 47 | 42 | 37 | 32 | 27 |

| Calculation results | | | | | | | |
|---|---|---|---|---|---|---|---|
| Pressure ratio | | | 5.66 | 5.66 | 5.67 | 5.68 | 5.68 |
| Volumetric efficiency | | | 84.0% | 84.1% | 84.1% | 84.1% | 84.2% |
| condenser glide | K | | 0.4 | 0.4 | 0.3 | 0.3 | 0.2 |
| Evaporator glide | K | | 0.2 | 0.2 | 0.1 | 0.1 | 0.1 |
| Evaporator inlet temperature | °C. | | −0.1 | −0.1 | −0.1 | −0.1 | 0.0 |
| Condenser exit temperature | °C. | | 54.8 | 54.8 | 54.8 | 54.9 | 54.9 |
| Condenser pressure | bar | | 15.07 | 15.26 | 15.43 | 15.60 | 15.75 |
| Evaporator pressure | bar | | 2.66 | 2.69 | 2.72 | 2.75 | 2.77 |
| Refrigeration effect | kJ/kg | | 134.17 | 134.96 | 135.83 | 136.77 | 137.79 |
| COP | | | 2.06 | 2.06 | 2.06 | 2.06 | 2.06 |
| Discharge temperature | °C. | | 97.75 | 98.35 | 98.95 | 99.57 | 100.21 |
| Mass flow rate | kg/hr | | 160.99 | 160.04 | 159.02 | 157.93 | 156.76 |
| Volumetric flow rate | m³/hr | | 14.35 | 14.16 | 13.99 | 13.83 | 13.68 |
| Volumetric capacity | kJ/m³ | | 1505 | 1525 | 1544 | 1562 | 1579 |
| Pressure drop | kPa/m | | 978 | 961 | 945 | 929 | 914 |
| GWP (TAR BASIS) | | | 420 | 485 | 550 | 615 | 679 |
| F/(F + H) | | | 0.557 | 0.557 | 0.558 | 0.558 | 0.559 |
| Capacity relative to 1234yf | | | 97.8% | 99.1% | 100.3% | 101.5% | 102.5% |
| Relative COP | | | 107.8% | 107.8% | 107.9% | 107.9% | 108.0% |
| Relative pressure drop | | | 79.0% | 77.6% | 76.3% | 75.0% | 73.8% |

TABLE 5

Theoretical Performance Data of Selected R-152a/R-1234ze(E)/R-134a Blends containing 24% b/w R-152a

| | | | | | 24 | 24 | 24 | 24 |
|---|---|---|---|---|---|---|---|---|
| R-152a (% b/w) | | | | | 24 | 24 | 24 | 24 |
| R-134a (% b/w) | | | | | 10 | 15 | 20 | 25 |
| R-1234ze(E) (% b/w) | | | | | 66 | 61 | 56 | 51 |

| | | COMPARATIVE DATA | | | | | | |
|---|---|---|---|---|---|---|---|---|
| Calculation results | | 134a | R1234yf | R1234ze(E) | 24/10/66 | 24/15/61 | 24/20/56 | 24/25/51 |
| Pressure ratio | | 5.79 | 5.24 | 5.75 | 5.67 | 5.66 | 5.66 | 5.66 |
| Volumetric efficiency | | 83.6% | 84.7% | 82.8% | 83.9% | 83.9% | 84.0% | 84.0% |
| condenser glide | K | 0.0 | 0.0 | 0.0 | 0.5 | 0.5 | 0.5 | 0.4 |
| Evaporator glide | K | 0.0 | 0.0 | 0.0 | 0.3 | 0.3 | 0.3 | 0.2 |
| Evaporator inlet temperature | °C. | 0.0 | 0.0 | 0.0 | −0.2 | −0.1 | −0.1 | −0.1 |
| Condenser exit temperature | °C. | 55.0 | 55.0 | 55.0 | 54.7 | 54.7 | 54.8 | 54.8 |
| Condenser P | bar | 16.88 | 16.46 | 12.38 | 14.25 | 14.47 | 14.69 | 14.90 |
| Evaporator P | bar | 2.92 | 3.14 | 2.15 | 2.51 | 2.56 | 2.59 | 2.63 |
| Refrigeration effect | kJ/kg | 123.76 | 94.99 | 108.63 | 132.54 | 133.13 | 133.78 | 134.47 |
| COP | | 2.03 | 1.91 | 2.01 | 2.06 | 2.06 | 2.06 | 2.06 |
| Discharge T | °C. | 99.15 | 92.88 | 86.66 | 95.80 | 96.36 | 96.92 | 97.49 |
| Mass flow rate | kg/hr | 174.53 | 227.39 | 198.83 | 162.98 | 162.24 | 161.46 | 160.63 |
| Volumetric flow rate | m³/hr | 13.16 | 14.03 | 18.29 | 15.20 | 14.95 | 14.72 | 14.50 |
| Volumetric capacity | kJ/m³ | 1641 | 1540 | 1181 | 1421 | 1445 | 1468 | 1489 |
| Pressure drop | kPa/m | 953 | 1239 | 1461 | 1045 | 1025 | 1005 | 987 |
| GWP (TAR BASIS) | | | | 6 | 163 | 227 | 292 | 357 |
| F/(F + H) | | | | 0.667 | 0.550 | 0.551 | 0.551 | 0.552 |
| Capacity relative to 1234yf | | 106.6% | 100.0% | 76.7% | 92.3% | 93.8% | 95.3% | 96.7% |
| Relative COP | | 106.0% | 100.0% | 105.3% | 108.0% | 107.9% | 107.9% | 107.9% |
| Relative pressure drop | | 76.9% | 100.0% | 117.9% | 84.4% | 82.7% | 81.2% | 79.7% |

TABLE 5-continued

Theoretical Performance Data of Selected R-152a/R-1234ze(E)/R-134a Blends containing 24% b/w R-152a

| | | | | | | | |
|---|---|---|---|---|---|---|---|
| | R-152a (% b/w) | | 24 | 24 | 24 | 24 | 24 |
| | R-134a (% b/w) | | 30 | 35 | 40 | 45 | 50 |
| | R-1234ze(E) (% b/w) | | 46 | 41 | 36 | 31 | 26 |
| | Calculation results | | 24/30/46 | 24/35/41 | 24/40/36 | 24/45/31 | 24/50/26 |
| | Pressure ratio | | 5.66 | 5.67 | 5.67 | 5.68 | 5.69 |
| | Volumetric efficiency | | 84.1% | 84.1% | 84.1% | 84.2% | 84.2% |
| | condenser glide | K | 0.4 | 0.4 | 0.3 | 0.2 | 0.2 |
| | Evaporator glide | K | 0.2 | 0.2 | 0.1 | 0.1 | 0.1 |
| | Evaporator inlet temperature | °C. | −0.1 | −0.1 | −0.1 | −0.1 | 0.0 |
| | Condenser exit temperature | °C. | 54.8 | 54.8 | 54.8 | 54.9 | 54.9 |
| | Condenser P | bar | 15.09 | 15.28 | 15.45 | 15.61 | 15.76 |
| | Evaporator P | bar | 2.67 | 2.70 | 2.72 | 2.75 | 2.77 |
| | Refrigeration effect | kJ/kg | 135.22 | 136.03 | 136.91 | 137.87 | 138.91 |
| | COP | | 2.06 | 2.06 | 2.06 | 2.07 | 2.07 |
| | Discharge T | °C. | 98.08 | 98.67 | 99.28 | 99.91 | 100.55 |
| | Mass flow rate | kg/hr | 159.74 | 158.79 | 157.76 | 156.67 | 155.50 |
| | Volumetric flow rate | m³/hr | 14.30 | 14.12 | 13.95 | 13.79 | 13.65 |
| | Volumetric capacity | kJ/m³ | 1510 | 1530 | 1548 | 1566 | 1583 |
| | Pressure drop | kPa/m | 969 | 953 | 937 | 921 | 906 |
| | GWP (TAR BASIS) | | 422 | 486 | 551 | 616 | 680 |
| | F/(F + H) | | 0.552 | 0.553 | 0.554 | 0.554 | 0.555 |
| | Capacity relative to 1234yf | | 98.1% | 99.4% | 100.6% | 101.7% | 102.8% |
| | Relative COP | | 107.9% | 107.9% | 108.0% | 108.0% | 108.1% |
| | Relative pressure drop | | 78.2% | 76.9% | 75.6% | 74.3% | 73.2% |

TABLE 6

Theoretical Performance Data of Selected R-152a/R-1234ze(E)/R-134a Blends containing 25% b/w R-152a

| | | | | | | 25 | 25 | 25 | 25 |
|---|---|---|---|---|---|---|---|---|---|
| R-152a (% b/w) | | | | | | 25 | 25 | 25 | 25 |
| R-134a (% b/w) | | | | | | 10 | 15 | 20 | 25 |
| R-1234ze(E) (% b/w) | | | | | | 65 | 60 | 55 | 50 |
| | | | COMPARATIVE DATA | | | | | | |
| Calculation results | | 134a | R1234yf | R1234ze(E) | | 25/10/65 | 25/15/60 | 25/20/55 | 25/25/50 |
| Pressure ratio | | 5.79 | 5.24 | 5.75 | | 5.67 | 5.66 | 5.66 | 5.66 |
| Volumetric efficiency | | 83.6% | 84.7% | 82.8% | | 83.9% | 84.0% | 84.0% | 84.1% |
| condenser glide | K | 0.0 | 0.0 | 0.0 | | 0.5 | 0.5 | 0.5 | 0.4 |
| Evaporator glide | K | 0.0 | 0.0 | 0.0 | | 0.3 | 0.3 | 0.3 | 0.2 |
| Evaporator inlet temperature | °C. | 0.0 | 0.0 | 0.0 | | −0.2 | −0.1 | −0.1 | −0.1 |
| Condenser exit temperature | °C. | 55.0 | 55.0 | 55.0 | | 54.8 | 54.8 | 54.8 | 54.8 |
| Condenser P | bar | 16.88 | 16.46 | 12.38 | | 14.28 | 14.51 | 14.72 | 14.92 |
| Evaporator P | bar | 2.92 | 3.14 | 2.15 | | 2.52 | 2.56 | 2.60 | 2.64 |
| Refrigeration effect | kJ/kg | 123.76 | 94.99 | 108.63 | | 133.53 | 134.14 | 134.80 | 135.51 |
| COP | | 2.03 | 1.91 | 2.01 | | 2.07 | 2.07 | 2.07 | 2.07 |
| Discharge T | °C. | 99.15 | 92.88 | 86.66 | | 96.12 | 96.67 | 97.24 | 97.81 |
| Mass flow rate | kg/hr | 174.53 | 227.39 | 198.83 | | 161.76 | 161.02 | 160.24 | 159.40 |
| Volumetric flow rate | m³/hr | 13.16 | 14.03 | 18.29 | | 15.13 | 14.89 | 14.66 | 14.45 |
| Volumetric capacity | kJ/m³ | 1641 | 1540 | 1181 | | 1427 | 1451 | 1473 | 1494 |
| Pressure drop | kPa/m | 953 | 1239 | 1461 | | 1035 | 1015 | 996 | 978 |
| GWP (TAR BASIS) | | | | 6 | | 164 | 229 | 293 | 358 |
| F/(F + H) | | | | 0.667 | | 0.546 | 0.547 | 0.547 | 0.548 |
| Capacity relative to 1234yf | | 106.6% | 100.0% | 76.7% | | 92.7% | 94.2% | 95.7% | 97.1% |
| Relative COP | | 106.0% | 100.0% | 105.3% | | 108.1% | 108.0% | 108.0% | 108.0% |
| Relative pressure drop | | 76.9% | 100.0% | 117.9% | | 83.6% | 81.9% | 80.4% | 78.9% |

TABLE 6-continued

Theoretical Performance Data of Selected R-152a/R-1234ze(E)/R-134a Blends containing 25% b/w R-152a

| | | | | | | | |
|---|---|---|---|---|---|---|---|
| R-152a (% b/w) | | | 25 | 25 | 25 | 25 | 25 |
| R-134a (% b/w) | | | 30 | 35 | 40 | 45 | 50 |
| R-1234ze(E) (% b/w) | | | 45 | 40 | 35 | 30 | 25 |
| | Calculation results | | 25/30/45 | 25/35/40 | 25/40/35 | 25/45/30 | 25/50/25 |
| | Pressure ratio | | 5.66 | 5.67 | 5.67 | 5.68 | 5.69 |
| | Volumetric efficiency | | 84.1% | 84.1% | 84.2% | 84.2% | 84.2% |
| | condenser glide | K | 0.4 | 0.3 | 0.3 | 0.2 | 0.2 |
| | Evaporator glide | K | 0.2 | 0.2 | 0.1 | 0.1 | 0.1 |
| | Evaporator inlet temperature | °C. | −0.1 | −0.1 | −0.1 | 0.0 | 0.0 |
| | Condenser exit temperature | °C. | 54.8 | 54.8 | 54.9 | 54.9 | 54.9 |
| | Condenser P | bar | 15.12 | 15.30 | 15.46 | 15.62 | 15.77 |
| | Evaporator P | bar | 2.67 | 2.70 | 2.73 | 2.75 | 2.77 |
| | Refrigeration effect | kJ/kg | 136.27 | 137.10 | 138.01 | 138.98 | 140.04 |
| | COP | | 2.07 | 2.07 | 2.07 | 2.07 | 2.07 |
| | Discharge T | °C. | 98.40 | 99.00 | 99.61 | 100.24 | 100.88 |
| | Mass flow rate | kg/hr | 158.51 | 157.54 | 156.52 | 155.42 | 154.25 |
| | Volumetric flow rate | m$^3$/hr | 14.26 | 14.08 | 13.91 | 13.76 | 13.62 |
| | Volumetric capacity | kJ/m$^3$ | 1515 | 1534 | 1553 | 1570 | 1586 |
| | Pressure drop | kPa/m | 961 | 944 | 928 | 913 | 899 |
| | GWP (TAR BASIS) | | 423 | 487 | 552 | 617 | 682 |
| | F/(F + H) | | 0.548 | 0.549 | 0.550 | 0.550 | 0.551 |
| | Capacity relative to 1234yf | | 98.4% | 99.6% | 100.8% | 102.0% | 103.0% |
| | Relative COP | | 108.0% | 108.1% | 108.1% | 108.2% | 108.2% |
| | Relative pressure drop | | 77.5% | 76.2% | 74.9% | 73.7% | 72.6% |

TABLE 7

Theoretical Performance Data of Selected R-152a/R-1234ze(E)/R-134a Blends containing 26% b/w R-152a

| | | | | | | | | |
|---|---|---|---|---|---|---|---|---|
| R-152a (% b/w) | | | | | 26 | 26 | 26 | 26 |
| R-134a (% b/w) | | | | | 10 | 15 | 20 | 25 |
| R-1234ze(E) (% b/w) | | | | | 64 | 59 | 54 | 49 |
| | | | COMPARATIVE DATA | | | | | |
| Calculation results | | 134a | R1234yf | R1234ze(E) | 26/10/64 | 26/15/59 | 26/20/54 | 26/25/49 |
| Pressure ratio | | 5.79 | 5.24 | 5.75 | 5.66 | 5.66 | 5.66 | 5.66 |
| Volumetric efficiency | | 83.6% | 84.7% | 82.8% | 83.9% | 84.0% | 84.0% | 84.1% |
| condenser glide | K | 0.0 | 0.0 | 0.0 | 0.5 | 0.5 | 0.4 | 0.4 |
| Evaporator glide | K | 0.0 | 0.0 | 0.0 | 0.3 | 0.3 | 0.3 | 0.2 |
| Evaporator inlet temperature | °C. | 0.0 | 0.0 | 0.0 | −0.1 | −0.1 | −0.1 | −0.1 |
| Condenser exit temperature | °C. | 55.0 | 55.0 | 55.0 | 54.8 | 54.8 | 54.8 | 54.8 |
| Condenser P | bar | 16.88 | 16.46 | 12.38 | 14.32 | 14.54 | 14.75 | 14.95 |
| Evaporator P | bar | 2.92 | 3.14 | 2.15 | 2.53 | 2.57 | 2.61 | 2.64 |
| Refrigeration effect | kJ/kg | 123.76 | 94.99 | 108.63 | 134.53 | 135.16 | 135.83 | 136.55 |
| COP | | 2.03 | 1.91 | 2.01 | 2.07 | 2.07 | 2.07 | 2.07 |
| Discharge T | °C. | 99.15 | 92.88 | 86.66 | 96.43 | 96.99 | 97.56 | 98.13 |
| Mass flow rate | kg/hr | 174.53 | 227.39 | 198.83 | 160.55 | 159.81 | 159.03 | 158.18 |
| Volumetric flow rate | m$^3$/hr | 13.16 | 14.03 | 18.29 | 15.07 | 14.83 | 14.61 | 14.41 |
| Volumetric capacity | kJ/m$^3$ | 1641 | 1540 | 1181 | 1433 | 1456 | 1478 | 1499 |
| Pressure drop | kPa/m | 953 | 1239 | 1461 | 1025 | 1006 | 987 | 969 |
| GWP (TAR BASIS) | | | | 6 | 165 | 230 | 294 | 359 |
| F/(F + H) | | | | 0.667 | 0.542 | 0.543 | 0.543 | 0.544 |
| Capacity relative to 1234yf | | 106.6% | 100.0% | 76.7% | 93.1% | 94.6% | 96.0% | 97.4% |
| Relative COP | | 106.0% | 100.0% | 105.3% | 108.2% | 108.1% | 108.1% | 108.1% |
| Relative pressure drop | | 76.9% | 100.0% | 117.9% | 82.7% | 81.2% | 79.7% | 78.2% |

TABLE 7-continued

Theoretical Performance Data of Selected R-152a/R-1234ze(E)/R-134a Blends containing 26% b/w R-152a

| | | | | | | | |
|---|---|---|---|---|---|---|---|
| R-152a (% b/w) | | | 26 | 26 | 26 | 26 | 26 |
| R-134a (% b/w) | | | 30 | 35 | 40 | 45 | 50 |
| R-1234ze(E) (% b/w) | | | 44 | 39 | 34 | 29 | 24 |
| Calculation results | | | 26/30/44 | 26/35/39 | 26/40/34 | 26/45/29 | 26/50/24 |
| | Pressure ratio | | 5.66 | 5.67 | 5.67 | 5.68 | 5.69 |
| | Volumetric efficiency | | 84.1% | 84.2% | 84.2% | 84.2% | 84.2% |
| | condenser glide | K | 0.4 | 0.3 | 0.3 | 0.2 | 0.2 |
| | Evaporator glide | K | 0.2 | 0.1 | 0.1 | 0.1 | 0.1 |
| | Evaporator inlet temperature | °C. | −0.1 | −0.1 | −0.1 | 0.0 | 0.0 |
| | Condenser exit temperature | °C. | 54.8 | 54.8 | 54.9 | 54.9 | 54.9 |
| | Condenser P | bar | 15.14 | 15.31 | 15.48 | 15.63 | 15.77 |
| | Evaporator P | bar | 2.67 | 2.70 | 2.73 | 2.75 | 2.77 |
| | Refrigeration effect | kJ/kg | 137.33 | 138.18 | 139.10 | 140.09 | 141.17 |
| | COP | | 2.07 | 2.07 | 2.07 | 2.07 | 2.07 |
| | Discharge T | °C. | 98.72 | 99.32 | 99.94 | 100.57 | 101.21 |
| | Mass flow rate | kg/hr | 157.28 | 156.32 | 155.28 | 154.18 | 153.01 |
| | Volumetric flow rate | m³/hr | 14.22 | 14.04 | 13.88 | 13.73 | 13.59 |
| | Volumetric capacity | kJ/m³ | 1519 | 1539 | 1557 | 1574 | 1590 |
| | Pressure drop | kPa/m | 952 | 936 | 921 | 906 | 892 |
| | GWP (TAR BASIS) | | 424 | 489 | 553 | 618 | 683 |
| | F/(F + H) | | 0.544 | 0.545 | 0.546 | 0.546 | 0.547 |
| | Capacity relative to 1234yf | | 98.7% | 99.9% | 101.1% | 102.2% | 103.2% |
| | Relative COP | | 108.1% | 108.2% | 108.2% | 108.3% | 108.4% |
| | Relative pressure drop | | 76.9% | 75.5% | 74.3% | 73.1% | 72.0% |

TABLE 8

Theoretical Performance Data of Selected R-152a/R-1234ze(E)/R-134a Blends containing 27% b/w R-152a

| | | COMPARATIVE DATA | | | | | | |
|---|---|---|---|---|---|---|---|---|
| R-152a (% b/w) | | | | | | 27 | 27 | 27 | 27 |
| R-134a (% b/w) | | | | | | 10 | 15 | 20 | 25 |
| R-1234ze(E) (% b/w) | | | | | | 63 | 58 | 53 | 48 |
| Calculation results | | 134a | R1234yf | R1234ze(E) | 27/10/63 | 27/15/58 | 27/20/53 | 27/25/48 |
| Pressure ratio | | 5.79 | 5.24 | 5.75 | 5.66 | 5.66 | 5.66 | 5.66 |
| Volumetric efficiency | | 83.6% | 84.7% | 82.8% | 84.0% | 84.0% | 84.1% | 84.1% |
| condenser glide | K | 0.0 | 0.0 | 0.0 | 0.5 | 0.5 | 0.4 | 0.4 |
| Evaporator glide | K | 0.0 | 0.0 | 0.0 | 0.3 | 0.3 | 0.2 | 0.2 |
| Evaporator inlet temperature | °C. | 0.0 | 0.0 | 0.0 | −0.1 | −0.1 | −0.1 | −0.1 |
| Condenser exit temperature | °C. | 55.0 | 55.0 | 55.0 | 54.8 | 54.8 | 54.8 | 54.8 |
| Condenser P | bar | 16.88 | 16.46 | 12.38 | 14.35 | 14.57 | 14.78 | 14.97 |
| Evaporator P | bar | 2.92 | 3.14 | 2.15 | 2.53 | 2.57 | 2.61 | 2.64 |
| Refrigeration effect | kJ/kg | 123.76 | 94.99 | 108.63 | 135.54 | 136.18 | 136.86 | 137.60 |
| COP | | 2.03 | 1.91 | 2.01 | 2.07 | 2.07 | 2.07 | 2.07 |
| Discharge T | °C. | 99.15 | 92.88 | 86.66 | 96.75 | 97.31 | 97.88 | 98.45 |
| Mass flow rate | kg/hr | 174.53 | 227.39 | 198.83 | 159.36 | 158.62 | 157.83 | 156.98 |
| Volumetric flow rate | m³/hr | 13.16 | 14.03 | 18.29 | 15.01 | 14.78 | 14.56 | 14.36 |
| Volumetric capacity | kJ/m³ | 1641 | 1540 | 1181 | 1439 | 1462 | 1483 | 1504 |
| Pressure drop | kPa/m | 953 | 1239 | 1461 | 1015 | 996 | 978 | 960 |
| GWP (TAR BASIS) | | | | 6 | 166 | 231 | 296 | 360 |
| F/(F + H) | | | | 0.667 | 0.538 | 0.539 | 0.539 | 0.540 |
| Capacity relative to 1234yf | | 106.6% | 100.0% | 76.7% | 93.5% | 94.9% | 96.3% | 97.7% |
| Relative COP | | 106.0% | 100.0% | 105.3% | 108.3% | 108.2% | 108.2% | 108.2% |
| Relative pressure drop | | 76.9% | 100.0% | 117.9% | 82.0% | 80.4% | 78.9% | 77.5% |

TABLE 8-continued

Theoretical Performance Data of Selected R-152a/R-1234ze(E)/R-134a Blends containing 27% b/w R-152a

| | | | | | | | |
|---|---|---|---|---|---|---|---|
| | R-152a (% b/w) | | 27 | 27 | 27 | 27 | 27 |
| | R-134a (% b/w) | | 30 | 35 | 40 | 45 | 50 |
| | R-1234ze(E) (% b/w) | | 43 | 38 | 33 | 28 | 23 |
| | Calculation results | | 27/30/43 | 27/35/38 | 27/40/33 | 27/45/28 | 27/50/23 |
| | Pressure ratio | | 5.66 | 5.67 | 5.67 | 5.68 | 5.69 |
| | Volumetric efficiency | | 84.2% | 84.2% | 84.2% | 84.2% | 84.3% |
| | condenser glide | K | 0.4 | 0.3 | 0.3 | 0.2 | 0.2 |
| | Evaporator glide | K | 0.2 | 0.1 | 0.1 | 0.1 | 0.1 |
| | Evaporator inlet temperature | °C. | −0.1 | −0.1 | −0.1 | 0.0 | 0.0 |
| | Condenser exit temperature | °C. | 54.8 | 54.8 | 54.9 | 54.9 | 54.9 |
| | Condenser P | bar | 15.16 | 15.33 | 15.49 | 15.64 | 15.78 |
| | Evaporator P | bar | 2.68 | 2.71 | 2.73 | 2.75 | 2.77 |
| | Refrigeration effect | kJ/kg | 138.40 | 139.26 | 140.20 | 141.21 | 142.30 |
| | COP | | 2.07 | 2.07 | 2.07 | 2.07 | 2.07 |
| | Discharge T | °C. | 99.04 | 99.65 | 100.26 | 100.90 | 101.54 |
| | Mass flow rate | kg/hr | 156.07 | 155.10 | 154.07 | 152.96 | 151.79 |
| | Volumetric flow rate | m$^3$/hr | 14.17 | 14.00 | 13.84 | 13.69 | 13.56 |
| | Volumetric capacity | kJ/m$^3$ | 1524 | 1543 | 1561 | 1577 | 1593 |
| | Pressure drop | kPa/m | 944 | 928 | 913 | 898 | 884 |
| | GWP (TAR BASIS) | | 425 | 490 | 554 | 619 | 684 |
| | F/(F + H) | | 0.540 | 0.541 | 0.542 | 0.542 | 0.543 |
| | Capacity relative to 1234yf | | 99.0% | 100.2% | 101.4% | 102.5% | 103.5% |
| | Relative COP | | 108.3% | 108.3% | 108.3% | 108.4% | 108.5% |
| | Relative pressure drop | | 76.2% | 74.9% | 73.7% | 72.5% | 71.4% |

TABLE 9

Theoretical Performance Data of Selected R-152a/R-1234ze(E)/R-134a Blends containing 28% b/w R-152a

| | | | | | | |
|---|---|---|---|---|---|---|
| R-152a (% b/w) | | | | 28 | 28 | 28 | 28 |
| R-134a (% b/w) | | | | 10 | 15 | 20 | 25 |
| R-1234ze(E) (% b/w) | | | | 62 | 57 | 52 | 47 |

| | | COMPARATIVE DATA | | | | | | |
|---|---|---|---|---|---|---|---|---|
| Calculation results | | 134a | R1234yf | R1234ze(E) | 28/10/62 | 28/15/57 | 28/20/52 | 28/25/47 |
| Pressure ratio | | 5.79 | 5.24 | 5.75 | 5.66 | 5.66 | 5.66 | 5.66 |
| Volumetric efficiency | | 83.6% | 84.7% | 82.8% | 84.0% | 84.1% | 84.1% | 84.1% |
| condenser glide | K | 0.0 | 0.0 | 0.0 | 0.5 | 0.4 | 0.4 | 0.4 |
| Evaporator glide | K | 0.0 | 0.0 | 0.0 | 0.3 | 0.3 | 0.2 | 0.2 |
| Evaporator inlet temperature | °C. | 0.0 | 0.0 | 0.0 | −0.1 | −0.1 | −0.1 | −0.1 |
| Condenser exit temperature | °C. | 55.0 | 55.0 | 55.0 | 54.8 | 54.8 | 54.8 | 54.8 |
| Condenser P | bar | 16.88 | 16.46 | 12.38 | 14.39 | 14.60 | 14.80 | 14.99 |
| Evaporator P | bar | 2.92 | 3.14 | 2.15 | 2.54 | 2.58 | 2.62 | 2.65 |
| Refrigeration effect | kJ/kg | 123.76 | 94.99 | 108.63 | 136.55 | 137.20 | 137.90 | 138.65 |
| COP | | 2.03 | 1.91 | 2.01 | 2.07 | 2.07 | 2.07 | 2.07 |
| Discharge T | °C. | 99.15 | 92.88 | 86.66 | 97.06 | 97.63 | 98.19 | 98.77 |
| Mass flow rate | kg/hr | 174.53 | 227.39 | 198.83 | 158.19 | 157.44 | 156.64 | 155.79 |
| Volumetric flow rate | m$^3$/hr | 13.16 | 14.03 | 18.29 | 14.95 | 14.72 | 14.51 | 14.31 |
| Volumetric capacity | kJ/m$^3$ | 1641 | 1540 | 1181 | 1445 | 1467 | 1489 | 1509 |
| Pressure drop | kPa/m | 953 | 1239 | 1461 | 1006 | 987 | 969 | 952 |
| GWP (TAR BASIS) | | | | 6 | 167 | 232 | 297 | 361 |
| F/(F + H) | | | | 0.667 | 0.534 | 0.535 | 0.535 | 0.536 |
| Capacity relative to 1234yf | | 106.6% | 100.0% | 76.7% | 93.8% | 95.3% | 96.7% | 98.0% |
| Relative COP | | 106.0% | 100.0% | 105.3% | 108.4% | 108.3% | 108.3% | 108.3% |
| Relative pressure drop | | 76.9% | 100.0% | 117.9% | 81.2% | 79.7% | 78.2% | 76.8% |

TABLE 9-continued

Theoretical Performance Data of Selected R-152a/R-1234ze(E)/R-134a Blends containing 28% b/w R-152a

| | | | | | | | |
|---|---|---|---|---|---|---|---|
| | R-152a (% b/w) | | 28 | 28 | 28 | 28 | 28 |
| | R-134a (% b/w) | | 30 | 35 | 40 | 45 | 50 |
| | R-1234ze(E) (% b/w) | | 42 | 37 | 32 | 27 | 22 |
| | Calculation results | | 28/30/42 | 28/35/37 | 28/40/32 | 28/45/27 | 28/50/22 |
| | Pressure ratio | | 5.66 | 5.67 | 5.67 | 5.68 | 5.69 |
| | Volumetric efficiency | | 84.2% | 84.2% | 84.2% | 84.3% | 84.3% |
| | condenser glide | K | 0.3 | 0.3 | 0.2 | 0.2 | 0.2 |
| | Evaporator glide | K | 0.2 | 0.1 | 0.1 | 0.1 | 0.1 |
| | Evaporator inlet temperature | ° C. | −0.1 | −0.1 | 0.0 | 0.0 | 0.0 |
| | Condenser exit temperature | ° C. | 54.8 | 54.9 | 54.9 | 54.9 | 54.9 |
| | Condenser P | bar | 15.18 | 15.35 | 15.51 | 15.65 | 15.79 |
| | Evaporator P | bar | 2.68 | 2.71 | 2.73 | 2.75 | 2.77 |
| | Refrigeration effect | kJ/kg | 139.46 | 140.35 | 141.30 | 142.33 | 143.44 |
| | COP | | 2.07 | 2.07 | 2.07 | 2.08 | 2.08 |
| | Discharge T | ° C. | 99.37 | 99.97 | 100.59 | 101.22 | 101.87 |
| | Mass flow rate | kg/hr | 154.88 | 153.90 | 152.87 | 151.76 | 150.59 |
| | Volumetric flow rate | m$^3$/hr | 14.13 | 13.96 | 13.81 | 13.66 | 13.53 |
| | Volumetric capacity | kJ/m$^3$ | 1529 | 1547 | 1565 | 1581 | 1596 |
| | Pressure drop | kPa/m | 936 | 920 | 905 | 891 | 877 |
| | GWP (TAR BASIS) | | 426 | 491 | 556 | 620 | 685 |
| | F/(F + H) | | 0.537 | 0.537 | 0.538 | 0.538 | 0.539 |
| | Capacity relative to 1234yf | | 99.3% | 100.5% | 101.6% | 102.7% | 103.7% |
| | Relative COP | | 108.4% | 108.4% | 108.5% | 108.5% | 108.6% |
| | Relative pressure drop | | 75.5% | 74.3% | 73.1% | 71.9% | 70.8% |

TABLE 10

Theoretical Performance Data of Selected R-152a/R-1234ze(E)/R-134a Blends containing 29% b/w R-152a

| | | | | | | | | | |
|---|---|---|---|---|---|---|---|---|---|
| R-152a (% b/w) | | | | | | 29 | 29 | 29 | 29 |
| R-134a (% b/w) | | | | | | 10 | 15 | 20 | 25 |
| R-1234ze(E) (% b/w) | | | | | | 61 | 56 | 51 | 46 |
| | | | COMPARATIVE DATA | | | | | | |
| Calculation results | | | 134a | R1234yf | R1234ze(E) | 29/10/61 | 29/15/56 | 29/20/51 | 29/25/46 |
| Pressure ratio | | | 5.79 | 5.24 | 5.75 | 5.66 | 5.66 | 5.66 | 5.66 |
| Volumetric efficiency | | | 83.6% | 84.7% | 82.8% | 84.1% | 84.1% | 84.1% | 84.2% |
| condenser glide | K | | 0.0 | 0.0 | 0.0 | 0.4 | 0.4 | 0.4 | 0.4 |
| Evaporator glide | K | | 0.0 | 0.0 | 0.0 | 0.3 | 0.2 | 0.2 | 0.2 |
| Evaporator inlet temperature | ° C. | | 0.0 | 0.0 | 0.0 | −0.1 | −0.1 | −0.1 | −0.1 |
| Condenser exit temperature | ° C. | | 55.0 | 55.0 | 55.0 | 54.8 | 54.8 | 54.8 | 54.8 |
| Condenser P | bar | | 16.88 | 16.46 | 12.38 | 14.42 | 14.63 | 14.83 | 15.02 |
| Evaporator P | bar | | 2.92 | 3.14 | 2.15 | 2.55 | 2.58 | 2.62 | 2.65 |
| Refrigeration effect | kJ/kg | | 123.76 | 94.99 | 108.63 | 137.56 | 138.22 | 138.93 | 139.70 |
| COP | | | 2.03 | 1.91 | 2.01 | 2.07 | 2.07 | 2.07 | 2.07 |
| Discharge T | ° C. | | 99.15 | 92.88 | 86.66 | 97.38 | 97.94 | 98.51 | 99.09 |
| Mass flow rate | kg/hr | | 174.53 | 227.39 | 198.83 | 157.02 | 156.27 | 155.47 | 154.61 |
| Volumetric flow rate | m$^3$/hr | | 13.16 | 14.03 | 18.29 | 14.89 | 14.67 | 14.46 | 14.27 |
| Volumetric capacity | kJ/m$^3$ | | 1641 | 1540 | 1181 | 1450 | 1472 | 1494 | 1514 |
| Pressure drop | kPa/m | | 953 | 1239 | 1461 | 996 | 978 | 960 | 944 |
| GWP (TAR BASIS) | | | | | 6 | 168 | 233 | 298 | 363 |
| F/(F + H) | | | | | 0.667 | 0.530 | 0.531 | 0.531 | 0.532 |
| Capacity relative to 1234yf | | | 106.6% | 100.0% | 76.7% | 94.2% | 95.6% | 97.0% | 98.3% |
| Relative COP | | | 106.0% | 100.0% | 105.3% | 108.5% | 108.5% | 108.4% | 108.5% |
| Relative pressure drop | | | 76.9% | 100.0% | 117.9% | 80.4% | 78.9% | 77.5% | 76.2% |

TABLE 10-continued

Theoretical Performance Data of Selected R-152a/R-1234ze(E)/R-134a Blends containing 29% b/w R-152a

| | | | | | | | |
|---|---|---|---|---|---|---|---|
| | R-152a (% b/w) | | 29 | 29 | 29 | 29 | 29 |
| | R-134a (% b/w) | | 30 | 35 | 40 | 45 | 50 |
| | R-1234ze(E) (% b/w) | | 41 | 36 | 31 | 26 | 21 |
| | Calculation results | | 29/30/41 | 29/35/36 | 29/40/31 | 29/45/26 | 29/50/21 |
| | Pressure ratio | | 5.66 | 5.67 | 5.68 | 5.69 | 5.70 |
| | Volumetric efficiency | | 84.2% | 84.2% | 84.3% | 84.3% | 84.3% |
| | condenser glide | K | 0.3 | 0.3 | 0.2 | 0.2 | 0.2 |
| | Evaporator glide | K | 0.2 | 0.1 | 0.1 | 0.1 | 0.1 |
| | Evaporator inlet temperature | °C. | −0.1 | −0.1 | 0.0 | 0.0 | 0.0 |
| | Condenser exit temperature | °C. | 54.8 | 54.9 | 54.9 | 54.9 | 54.9 |
| | Condenser P | bar | 15.20 | 15.36 | 15.52 | 15.66 | 15.79 |
| | Evaporator P | bar | 2.68 | 2.71 | 2.73 | 2.75 | 2.77 |
| | Refrigeration effect | kJ/kg | 140.54 | 141.44 | 142.41 | 143.45 | 144.58 |
| | COP | | 2.07 | 2.07 | 2.08 | 2.08 | 2.08 |
| | Discharge T | °C. | 99.69 | 100.29 | 100.92 | 101.55 | 102.20 |
| | Mass flow rate | kg/hr | 153.70 | 152.72 | 151.68 | 150.57 | 149.40 |
| | Volumetric flow rate | m³/hr | 14.09 | 13.92 | 13.77 | 13.63 | 13.50 |
| | Volumetric capacity | kJ/m³ | 1533 | 1551 | 1568 | 1585 | 1600 |
| | Pressure drop | kPa/m | 928 | 912 | 898 | 884 | 870 |
| | GWP (TAR BASIS) | | 427 | 492 | 557 | 621 | 686 |
| | F/(F + H) | | 0.533 | 0.533 | 0.534 | 0.535 | 0.535 |
| | Capacity relative to 1234yf | | 99.6% | 100.7% | 101.9% | 102.9% | 103.9% |
| | Relative COP | | 108.5% | 108.5% | 108.6% | 108.6% | 108.7% |
| | Relative pressure drop | | 74.9% | 73.6% | 72.5% | 71.3% | 70.2% |

TABLE 11

Theoretical Performance Data of Selected R-152a/R-1234ze(E)/R-134a Blends containing 30% b/w R-152a

| | | | | | | | | |
|---|---|---|---|---|---|---|---|---|
| R-152a (% b/w) | | | | | | 30 | 30 | 30 | 30 |
| R-134a (% b/w) | | | | | | 10 | 15 | 20 | 25 |
| R-1234ze(E) (% b/w) | | | | | | 60 | 55 | 50 | 45 |

| | | COMPARATIVE DATA | | | | | | |
|---|---|---|---|---|---|---|---|---|
| Calculation results | | 134a | R1234yf | R1234ze(E) | 30/10/60 | 30/15/55 | 30/20/50 | 30/25/45 |
| Pressure ratio | | 5.79 | 5.24 | 5.75 | 5.66 | 5.66 | 5.66 | 5.66 |
| Volumetric efficiency | | 83.6% | 84.7% | 82.8% | 84.1% | 84.1% | 84.2% | 84.2% |
| condenser glide | K | 0.0 | 0.0 | 0.0 | 0.4 | 0.4 | 0.4 | 0.3 |
| Evaporator glide | K | 0.0 | 0.0 | 0.0 | 0.3 | 0.2 | 0.2 | 0.2 |
| Evaporator inlet temperature | °C. | 0.0 | 0.0 | 0.0 | −0.1 | −0.1 | −0.1 | −0.1 |
| Condenser exit temperature | °C. | 55.0 | 55.0 | 55.0 | 54.8 | 54.8 | 54.8 | 54.8 |
| Condenser P | bar | 16.88 | 16.46 | 12.38 | 14.45 | 14.66 | 14.85 | 15.04 |
| Evaporator P | bar | 2.92 | 3.14 | 2.15 | 2.55 | 2.59 | 2.62 | 2.66 |
| Refrigeration effect | kJ/kg | 123.76 | 94.99 | 108.63 | 138.57 | 139.25 | 139.98 | 140.76 |
| COP | | 2.03 | 1.91 | 2.01 | 2.08 | 2.08 | 2.08 | 2.08 |
| Discharge T | °C. | 99.15 | 92.88 | 86.66 | 97.69 | 98.26 | 98.83 | 99.41 |
| Mass flow rate | kg/hr | 174.53 | 227.39 | 198.83 | 155.87 | 155.12 | 154.31 | 153.45 |
| Volumetric flow rate | m³/hr | 13.16 | 14.03 | 18.29 | 14.84 | 14.62 | 14.42 | 14.23 |
| Volumetric capacity | kJ/m³ | 1641 | 1540 | 1181 | 1456 | 1478 | 1498 | 1518 |
| Pressure drop | kPa/m | 953 | 1239 | 1461 | 987 | 969 | 952 | 935 |
| GWP (TAR BASIS) | | | | 6 | 170 | 234 | 299 | 364 |
| F/(F + H) | | | | 0.667 | 0.526 | 0.527 | 0.528 | 0.528 |
| Capacity relative to 1234yf | | 106.6% | 100.0% | 76.7% | 94.5% | 96.0% | 97.3% | 98.6% |
| Relative COP | | 106.0% | 100.0% | 105.3% | 108.6% | 108.6% | 108.6% | 108.6% |
| Relative pressure drop | | 76.9% | 100.0% | 117.9% | 79.7% | 78.2% | 76.8% | 75.5% |

TABLE 11-continued

Theoretical Performance Data of Selected R-152a/R-1234ze(E)/R-134a Blends containing 30% b/w R-152a

| | | | | | | | |
|---|---|---|---|---|---|---|---|
| R-152a (% b/w) | | | 30 | 30 | 30 | 30 | 30 |
| R-134a (% b/w) | | | 30 | 35 | 40 | 45 | 50 |
| R-1234ze(E) (% b/w) | | | 40 | 35 | 30 | 25 | 20 |
| | Calculation results | | 30/30/40 | 30/35/35 | 30/40/30 | 30/45/25 | 30/50/20 |
| | Pressure ratio | | 5.66 | 5.67 | 5.68 | 5.69 | 5.70 |
| | Volumetric efficiency | | 84.2% | 84.3% | 84.3% | 84.3% | 84.3% |
| | condenser glide | K | 0.3 | 0.3 | 0.2 | 0.2 | 0.2 |
| | Evaporator glide | K | 0.1 | 0.1 | 0.1 | 0.1 | 0.1 |
| | Evaporator inlet temperature | °C. | −0.1 | −0.1 | 0.0 | 0.0 | 0.0 |
| | Condenser exit temperature | °C. | 54.8 | 54.9 | 54.9 | 54.9 | 54.9 |
| | Condenser P | bar | 15.21 | 15.38 | 15.53 | 15.67 | 15.80 |
| | Evaporator P | bar | 2.69 | 2.71 | 2.74 | 2.76 | 2.77 |
| | Refrigeration effect | kJ/kg | 141.61 | 142.53 | 143.52 | 144.58 | 145.72 |
| | COP | | 2.08 | 2.08 | 2.08 | 2.08 | 2.08 |
| | Discharge T | °C. | 100.01 | 100.62 | 101.24 | 101.88 | 102.53 |
| | Mass flow rate | kg/hr | 152.53 | 151.55 | 150.51 | 149.40 | 148.23 |
| | Volumetric flow rate | m$^3$/hr | 14.05 | 13.89 | 13.74 | 13.60 | 13.48 |
| | Volumetric capacity | kJ/m$^3$ | 1537 | 1555 | 1572 | 1588 | 1603 |
| | Pressure drop | kPa/m | 920 | 905 | 890 | 877 | 863 |
| | GWP (TAR BASIS) | | 428 | 493 | 558 | 623 | 687 |
| | F/(F + H) | | 0.529 | 0.530 | 0.530 | 0.531 | 0.531 |
| | Capacity relative to 1234yf | | 99.8% | 101.0% | 102.1% | 103.1% | 104.1% |
| | Relative COP | | 108.6% | 108.6% | 108.7% | 108.8% | 108.9% |
| | Relative pressure drop | | 74.2% | 73.0% | 71.9% | 70.8% | 69.7% |

TABLE 12

Theoretical Performance Data of Selected R-152a/R-1234ze(E)/R-134a Blends containing 31% b/w R-152a

| | | | | | | | | |
|---|---|---|---|---|---|---|---|---|
| R-152a (% b/w) | | | | | 31 | 31 | 31 | 31 |
| R-134a (% b/w) | | | | | 10 | 15 | 20 | 25 |
| R-1234ze(E) (% b/w) | | | | | 59 | 54 | 49 | 44 |

| | | COMPARATIVE DATA | | | | | | |
|---|---|---|---|---|---|---|---|---|
| Calculation results | | 134a | R1234yf | R1234ze(E) | 31/10/59 | 31/15/54 | 31/20/49 | 31/25/44 |
| Pressure ratio | | 5.79 | 5.24 | 5.75 | 5.66 | 5.66 | 5.66 | 5.66 |
| Volumetric efficiency | | 83.6% | 84.7% | 82.8% | 84.1% | 84.2% | 84.2% | 84.2% |
| condenser glide | K | 0.0 | 0.0 | 0.0 | 0.4 | 0.4 | 0.4 | 0.3 |
| Evaporator glide | K | 0.0 | 0.0 | 0.0 | 0.2 | 0.2 | 0.2 | 0.2 |
| Evaporator inlet temperature | °C. | 0.0 | 0.0 | 0.0 | −0.1 | −0.1 | −0.1 | −0.1 |
| Condenser exit temperature | °C. | 55.0 | 55.0 | 55.0 | 54.8 | 54.8 | 54.8 | 54.8 |
| Condenser P | bar | 16.88 | 16.46 | 12.38 | 14.48 | 14.68 | 14.88 | 15.06 |
| Evaporator P | bar | 2.92 | 3.14 | 2.15 | 2.56 | 2.60 | 2.63 | 2.66 |
| Refrigeration effect | kJ/kg | 123.76 | 94.99 | 108.63 | 139.59 | 140.28 | 141.03 | 141.83 |
| COP | | 2.03 | 1.91 | 2.01 | 2.08 | 2.08 | 2.08 | 2.08 |
| Discharge T | °C. | 99.15 | 92.88 | 86.66 | 98.01 | 98.57 | 99.15 | 99.73 |
| Mass flow rate | kg/hr | 174.53 | 227.39 | 198.83 | 154.74 | 153.97 | 153.16 | 152.30 |
| Volumetric flow rate | m$^3$/hr | 13.16 | 14.03 | 18.29 | 14.78 | 14.57 | 14.37 | 14.18 |
| Volumetric capacity | kJ/m$^3$ | 1641 | 1540 | 1181 | 1461 | 1483 | 1503 | 1523 |
| Pressure drop | kPa/m | 953 | 1239 | 1461 | 978 | 960 | 944 | 927 |
| GWP (TAR BASIS) | | | | 6 | 171 | 235 | 300 | 365 |
| F/(F + H) | | | | 0.667 | 0.522 | 0.523 | 0.524 | 0.524 |
| Capacity relative to 1234yf | | 106.6% | 100.0% | 76.7% | 94.9% | 96.3% | 97.6% | 98.9% |
| Relative COP | | 106.0% | 100.0% | 105.3% | 108.7% | 108.7% | 108.7% | 108.7% |
| Relative pressure drop | | 76.9% | 100.0% | 117.9% | 79.0% | 77.5% | 76.2% | 74.9% |

TABLE 12-continued

Theoretical Performance Data of Selected R-152a/R-1234ze(E)/R-134a Blends containing 31% b/w R-152a

| | | | | | | | |
|---|---|---|---|---|---|---|---|
| R-152a (% b/w) | | | 31 | 31 | 31 | 31 | 31 |
| R-134a (% b/w) | | | 30 | 35 | 40 | 45 | 50 |
| R-1234ze(E) (% b/w) | | | 39 | 34 | 29 | 24 | 19 |
| | Calculation results | | 31/30/39 | 31/35/34 | 31/40/29 | 31/45/24 | 31/50/19 |
| | Pressure ratio | | 5.67 | 5.67 | 5.68 | 5.69 | 5.70 |
| | Volumetric efficiency | | 84.3% | 84.3% | 84.3% | 84.3% | 84.4% |
| | condenser glide | K | 0.3 | 0.2 | 0.2 | 0.2 | 0.1 |
| | Evaporator glide | K | 0.1 | 0.1 | 0.1 | 0.1 | 0.1 |
| | Evaporator inlet temperature | °C. | −0.1 | −0.1 | 0.0 | 0.0 | 0.0 |
| | Condenser exit temperature | °C. | 54.9 | 54.9 | 54.9 | 54.9 | 54.9 |
| | Condenser P | bar | 15.23 | 15.39 | 15.54 | 15.68 | 15.80 |
| | Evaporator P | bar | 2.69 | 2.71 | 2.74 | 2.76 | 2.77 |
| | Refrigeration effect | kJ/kg | 142.69 | 143.62 | 144.63 | 145.71 | 146.87 |
| | COP | | 2.08 | 2.08 | 2.08 | 2.08 | 2.08 |
| | Discharge T | °C. | 100.33 | 100.94 | 101.57 | 102.21 | 102.86 |
| | Mass flow rate | kg/hr | 151.38 | 150.39 | 149.35 | 148.24 | 147.07 |
| | Volumetric flow rate | m$^3$/hr | 14.01 | 13.85 | 13.71 | 13.57 | 13.45 |
| | Volumetric capacity | kJ/m$^3$ | 1542 | 1559 | 1576 | 1591 | 1606 |
| | Pressure drop | kPa/m | 912 | 897 | 883 | 870 | 857 |
| | GWP (TAR BASIS) | | 430 | 494 | 559 | 624 | 688 |
| | F/(F + H) | | 0.525 | 0.526 | 0.526 | 0.527 | 0.528 |
| | Capacity relative to 1234yf | | 100.1% | 101.3% | 102.3% | 103.4% | 104.3% |
| | Relative COP | | 108.7% | 108.7% | 108.8% | 108.9% | 109.0% |
| | Relative pressure drop | | 73.6% | 72.4% | 71.3% | 70.2% | 69.1% |

TABLE 13

Theoretical Performance Data of Selected R-152a/R-1234ze(E)/R-134a Blends containing 32% b/w R-152a

| | | 32 | 32 | 32 | 32 |
|---|---|---|---|---|---|
| R-152a (% b/w) | | 32 | 32 | 32 | 32 |
| R-134a (% b/w) | | 10 | 15 | 20 | 25 |
| R-1234ze(E) (% b/w) | | 58 | 53 | 48 | 43 |

| | | COMPARATIVE DATA | | | | | | |
|---|---|---|---|---|---|---|---|---|
| Calculation results | | 134a | R1234yf | R1234ze(E) | 32/10/58 | 32/15/53 | 32/20/48 | 32/25/43 |
| Pressure ratio | | 5.79 | 5.24 | 5.75 | 5.66 | 5.66 | 5.66 | 5.66 |
| Volumetric efficiency | | 83.6% | 84.7% | 82.8% | 84.2% | 84.2% | 84.2% | 84.3% |
| condenser glide | K | 0.0 | 0.0 | 0.0 | 0.4 | 0.4 | 0.3 | 0.3 |
| Evaporator glide | K | 0.0 | 0.0 | 0.0 | 0.2 | 0.2 | 0.2 | 0.2 |
| Evaporator inlet temperature | °C. | 0.0 | 0.0 | 0.0 | −0.1 | −0.1 | −0.1 | −0.1 |
| Condenser exit temperature | °C. | 55.0 | 55.0 | 55.0 | 54.8 | 54.8 | 54.8 | 54.8 |
| Condenser P | bar | 16.88 | 16.46 | 12.38 | 14.51 | 14.71 | 14.90 | 15.08 |
| Evaporator P | bar | 2.92 | 3.14 | 2.15 | 2.56 | 2.60 | 2.63 | 2.66 |
| Refrigeration effect | kJ/kg | 123.76 | 94.99 | 108.63 | 140.61 | 141.32 | 142.08 | 142.89 |
| COP | | 2.03 | 1.91 | 2.01 | 2.08 | 2.08 | 2.08 | 2.08 |
| Discharge T | °C. | 99.15 | 92.88 | 86.66 | 98.32 | 98.88 | 99.46 | 100.05 |
| Mass flow rate | kg/hr | 174.53 | 227.39 | 198.83 | 153.61 | 152.85 | 152.03 | 151.16 |
| Volumetric flow rate | m$^3$/hr | 13.16 | 14.03 | 18.29 | 14.73 | 14.52 | 14.32 | 14.14 |
| Volumetric capacity | kJ/m$^3$ | 1641 | 1540 | 1181 | 1466 | 1488 | 1508 | 1527 |
| Pressure drop | kPa/m | 953 | 1239 | 1461 | 969 | 952 | 935 | 920 |
| GWP (TAR BASIS) | | | | 6 | 172 | 237 | 301 | 366 |
| F/(F + H) | | | | 0.667 | 0.519 | 0.519 | 0.520 | 0.521 |
| Capacity relative to 1234yf | | 106.6% | 100.0% | 76.7% | 95.2% | 96.6% | 97.9% | 99.2% |
| Relative COP | | 106.0% | 100.0% | 105.3% | 108.8% | 108.8% | 108.8% | 108.8% |
| Relative pressure drop | | 76.9% | 100.0% | 117.9% | 78.2% | 76.8% | 75.5% | 74.2% |

TABLE 13-continued

Theoretical Performance Data of Selected R-152a/R-1234ze(E)/R-134a Blends containing 32% b/w R-152a

| | | | | | | | |
|---|---|---|---|---|---|---|---|
| | R-152a (% b/w) | | 32 | 32 | 32 | 32 | 32 |
| | R-134a (% b/w) | | 30 | 35 | 40 | 45 | 50 |
| | R-1234ze(E) (% b/w) | | 38 | 33 | 28 | 23 | 18 |
| | Calculation results | | 32/30/38 | 32/35/33 | 32/40/28 | 32/45/23 | 32/50/18 |
| | Pressure ratio | | 5.67 | 5.67 | 5.68 | 5.69 | 5.70 |
| | Volumetric efficiency | | 84.3% | 84.3% | 84.4% | 84.4% | 84.4% |
| | condenser glide | K | 0.3 | 0.2 | 0.2 | 0.2 | 0.1 |
| | Evaporator glide | K | 0.1 | 0.1 | 0.1 | 0.1 | 0.0 |
| | Evaporator inlet temperature | ° C. | −0.1 | 0.0 | 0.0 | 0.0 | 0.0 |
| | Condenser exit temperature | ° C. | 54.9 | 54.9 | 54.9 | 54.9 | 54.9 |
| | Condenser P | bar | 15.25 | 15.41 | 15.55 | 15.69 | 15.81 |
| | Evaporator P | bar | 2.69 | 2.72 | 2.74 | 2.76 | 2.77 |
| | Refrigeration effect | kJ/kg | 143.77 | 144.72 | 145.75 | 146.85 | 148.02 |
| | COP | | 2.08 | 2.08 | 2.08 | 2.08 | 2.09 |
| | Discharge T | ° C. | 100.65 | 101.26 | 101.89 | 102.53 | 103.19 |
| | Mass flow rate | kg/hr | 150.23 | 149.25 | 148.20 | 147.09 | 145.92 |
| | Volumetric flow rate | m$^3$/hr | 13.97 | 13.82 | 13.68 | 13.54 | 13.43 |
| | Volumetric capacity | kJ/m$^3$ | 1546 | 1563 | 1579 | 1595 | 1609 |
| | Pressure drop | kPa/m | 904 | 890 | 876 | 863 | 850 |
| | GWP (TAR BASIS) | | 431 | 495 | 560 | 625 | 689 |
| | F/(F + H) | | 0.521 | 0.522 | 0.523 | 0.523 | 0.524 |
| | Capacity relative to 1234yf | | 100.4% | 101.5% | 102.6% | 103.6% | 104.5% |
| | Relative COP | | 108.8% | 108.9% | 108.9% | 109.0% | 109.1% |
| | Relative pressure drop | | 73.0% | 71.8% | 70.7% | 69.6% | 68.6% |

TABLE 14

Theoretical Performance Data of Selected R-152a/R-1234ze(E)/R-134a Blends containing 33% b/w R-152a

| R-152a (% b/w) | | | | | 33 | 33 | 33 | 33 |
|---|---|---|---|---|---|---|---|---|
| R-134a (% b/w) | | | | | 10 | 15 | 20 | 25 |
| R-1234ze(E) (% b/w) | | | | | 57 | 52 | 47 | 42 |

| | | COMPARATIVE DATA | | | | | | |
|---|---|---|---|---|---|---|---|---|
| Calculation results | | 134a | R1234yf | R1234ze(E) | 33/10/57 | 33/15/52 | 33/20/47 | 33/25/42 |
| Pressure ratio | | 5.79 | 5.24 | 5.75 | 5.66 | 5.66 | 5.66 | 5.66 |
| Volumetric efficiency | | 83.6% | 84.7% | 82.8% | 84.2% | 84.2% | 84.3% | 84.3% |
| condenser glide | K | 0.0 | 0.0 | 0.0 | 0.4 | 0.4 | 0.3 | 0.3 |
| Evaporator glide | K | 0.0 | 0.0 | 0.0 | 0.2 | 0.2 | 0.2 | 0.1 |
| Evaporator inlet temperature | ° C. | 0.0 | 0.0 | 0.0 | −0.1 | −0.1 | −0.1 | −0.1 |
| Condenser exit temperature | ° C. | 55.0 | 55.0 | 55.0 | 54.8 | 54.8 | 54.8 | 54.9 |
| Condenser P | bar | 16.88 | 16.46 | 12.38 | 14.54 | 14.74 | 14.92 | 15.10 |
| Evaporator P | bar | 2.92 | 3.14 | 2.15 | 2.57 | 2.60 | 2.64 | 2.67 |
| Refrigeration effect | kJ/kg | 123.76 | 94.99 | 108.63 | 141.64 | 142.36 | 143.13 | 143.96 |
| COP | | 2.03 | 1.91 | 2.01 | 2.08 | 2.08 | 2.08 | 2.08 |
| Discharge T | ° C. | 99.15 | 92.88 | 86.66 | 98.63 | 99.20 | 99.78 | 100.37 |
| Mass flow rate | kg/hr | 174.53 | 227.39 | 198.83 | 152.50 | 151.73 | 150.91 | 150.04 |
| Volumetric flow rate | m$^3$/hr | 13.16 | 14.03 | 18.29 | 14.68 | 14.47 | 14.28 | 14.10 |
| Volumetric capacity | kJ/m$^3$ | 1641 | 1540 | 1181 | 1472 | 1493 | 1513 | 1532 |
| Pressure drop | kPa/m | 953 | 1239 | 1461 | 961 | 944 | 927 | 912 |
| GWP (TAR BASIS) | | | | 6 | 173 | 238 | 302 | 367 |
| F/(F + H) | | | | 0.667 | 0.515 | 0.516 | 0.516 | 0.517 |
| Capacity relative to 1234yf | | 106.6% | 100.0% | 76.7% | 95.6% | 96.9% | 98.2% | 99.5% |
| Relative COP | | 106.0% | 100.0% | 105.3% | 108.9% | 108.9% | 108.9% | 108.9% |
| Relative pressure drop | | 76.9% | 100.0% | 117.9% | 77.5% | 76.2% | 74.8% | 73.6% |

TABLE 14-continued

Theoretical Performance Data of Selected R-152a/R-1234ze(E)/R-134a Blends containing 33% b/w R-152a

| | | | | | | | |
|---|---|---|---|---|---|---|---|
| R-152a (% b/w) | | | 33 | 33 | 33 | 33 | 33 |
| R-134a (% b/w) | | | 30 | 35 | 40 | 45 | 50 |
| R-1234ze(E) (% b/w) | | | 37 | 32 | 27 | 22 | 17 |
| Calculation results | | | 33/30/37 | 33/35/32 | 33/40/27 | 33/45/22 | 33/50/17 |
| | Pressure ratio | | 5.67 | 5.67 | 5.68 | 5.69 | 5.71 |
| | Volumetric efficiency | | 84.3% | 84.4% | 84.4% | 84.4% | 84.4% |
| | condenser glide | K | 0.3 | 0.2 | 0.2 | 0.2 | 0.1 |
| | Evaporator glide | K | 0.1 | 0.1 | 0.1 | 0.1 | 0.0 |
| | Evaporator inlet temperature | °C. | −0.1 | 0.0 | 0.0 | 0.0 | 0.0 |
| | Condenser exit temperature | °C. | 54.9 | 54.9 | 54.9 | 54.9 | 54.9 |
| | Condenser P | bar | 15.26 | 15.42 | 15.56 | 15.69 | 15.81 |
| | Evaporator P | bar | 2.69 | 2.72 | 2.74 | 2.76 | 2.77 |
| | Refrigeration effect | kJ/kg | 144.86 | 145.83 | 146.87 | 147.98 | 149.18 |
| | COP | | 2.08 | 2.08 | 2.08 | 2.09 | 2.09 |
| | Discharge T | °C. | 100.97 | 101.58 | 102.21 | 102.86 | 103.52 |
| | Mass flow rate | kg/hr | 149.11 | 148.12 | 147.07 | 145.96 | 144.79 |
| | Volumetric flow rate | m³/hr | 13.94 | 13.79 | 13.65 | 13.52 | 13.40 |
| | Volumetric capacity | kJ/m³ | 1550 | 1567 | 1583 | 1598 | 1612 |
| | Pressure drop | kPa/m | 897 | 883 | 869 | 856 | 844 |
| | GWP (TAR BASIS) | | 432 | 497 | 561 | 626 | 691 |
| | F/(F + H) | | 0.518 | 0.518 | 0.519 | 0.520 | 0.520 |
| | Capacity relative to 1234yf | | 100.7% | 101.8% | 102.8% | 103.8% | 104.7% |
| | Relative COP | | 108.9% | 109.0% | 109.0% | 109.1% | 109.2% |
| | Relative pressure drop | | 72.4% | 71.2% | 70.2% | 69.1% | 68.1% |

TABLE 15

Theoretical Performance Data of Selected R-152a/R-1234ze(E)/R-134a Blends containing 34% b/w R-152a

| | | | | | 34 | 34 | 34 | 34 |
|---|---|---|---|---|---|---|---|---|
| R-152a (% b/w) | | | | | 34 | 34 | 34 | 34 |
| R-134a (% b/w) | | | | | 10 | 15 | 20 | 25 |
| R-1234ze(E) (% b/w) | | | | | 56 | 51 | 46 | 41 |

| | | COMPARATIVE DATA | | | | | | |
|---|---|---|---|---|---|---|---|---|
| Calculation results | | 134a | R1234yf | R1234ze(E) | 34/10/56 | 34/15/51 | 34/20/46 | 34/25/41 |
| Pressure ratio | | 5.79 | 5.24 | 5.75 | 5.66 | 5.66 | 5.66 | 5.66 |
| Volumetric efficiency | | 83.6% | 84.7% | 82.8% | 84.2% | 84.3% | 84.3% | 84.3% |
| condenser glide | K | 0.0 | 0.0 | 0.0 | 0.4 | 0.3 | 0.3 | 0.3 |
| Evaporator glide | K | 0.0 | 0.0 | 0.0 | 0.2 | 0.2 | 0.2 | 0.1 |
| Evaporator inlet temperature | °C. | 0.0 | 0.0 | 0.0 | −0.1 | −0.1 | −0.1 | −0.1 |
| Condenser exit temperature | °C. | 55.0 | 55.0 | 55.0 | 54.8 | 54.8 | 54.8 | 54.9 |
| Condenser P | bar | 16.88 | 16.46 | 12.38 | 14.57 | 14.76 | 14.94 | 15.12 |
| Evaporator P | bar | 2.92 | 3.14 | 2.15 | 2.58 | 2.61 | 2.64 | 2.67 |
| Refrigeration effect | kJ/kg | 123.76 | 94.99 | 108.63 | 142.67 | 143.40 | 144.19 | 145.04 |
| COP | | 2.03 | 1.91 | 2.01 | 2.08 | 2.08 | 2.08 | 2.08 |
| Discharge T | °C. | 99.15 | 92.88 | 86.66 | 98.94 | 99.51 | 100.09 | 100.68 |
| Mass flow rate | kg/hr | 174.53 | 227.39 | 198.83 | 151.40 | 150.62 | 149.80 | 148.92 |
| Volumetric flow rate | m³/hr | 13.16 | 14.03 | 18.29 | 14.63 | 14.43 | 14.24 | 14.06 |
| Volumetric capacity | kJ/m³ | 1641 | 1540 | 1181 | 1477 | 1497 | 1517 | 1536 |
| Pressure drop | kPa/m | 953 | 1239 | 1461 | 952 | 935 | 919 | 904 |
| GWP (TAR BASIS) | | | | 6 | 174 | 239 | 304 | 368 |
| F/(F + H) | | | | 0.667 | 0.511 | 0.512 | 0.513 | 0.513 |
| Capacity relative to 1234yf | | 106.6% | 100.0% | 76.7% | 95.9% | 97.2% | 98.5% | 99.8% |
| Relative COP | | 106.0% | 100.0% | 105.3% | 109.0% | 109.0% | 109.0% | 109.0% |
| Relative pressure drop | | 76.9% | 100.0% | 117.9% | 76.9% | 75.5% | 74.2% | 73.0% |

TABLE 15-continued

Theoretical Performance Data of Selected R-152a/R-1234ze(E)/R-134a Blends containing 34% b/w R-152a

| | | | | | | | |
|---|---|---|---|---|---|---|---|
| R-152a (% b/w) | | | 34 | 34 | 34 | 34 | 34 |
| R-134a (% b/w) | | | 30 | 35 | 40 | 45 | 50 |
| R-1234ze(E) (% b/w) | | | 36 | 31 | 26 | 21 | 16 |
| Calculation results | | | 34/30/36 | 34/35/31 | 34/40/26 | 34/45/21 | 34/50/16 |
| | Pressure ratio | | 5.67 | 5.68 | 5.68 | 5.70 | 5.71 |
| | Volumetric efficiency | | 84.4% | 84.4% | 84.4% | 84.4% | 84.4% |
| | condenser glide | K | 0.2 | 0.2 | 0.2 | 0.2 | 0.1 |
| | Evaporator glide | K | 0.1 | 0.1 | 0.1 | 0.1 | 0.0 |
| | Evaporator inlet temperature | °C. | −0.1 | 0.0 | 0.0 | 0.0 | 0.0 |
| | Condenser exit temperature | °C. | 54.9 | 54.9 | 54.9 | 54.9 | 54.9 |
| | Condenser P | bar | 15.28 | 15.43 | 15.57 | 15.70 | 15.82 |
| | Evaporator P | bar | 2.70 | 2.72 | 2.74 | 2.76 | 2.77 |
| | Refrigeration effect | kJ/kg | 145.95 | 146.94 | 147.99 | 149.13 | 150.33 |
| | COP | | 2.08 | 2.09 | 2.09 | 2.09 | 2.09 |
| | Discharge T | °C. | 101.29 | 101.91 | 102.54 | 103.19 | 103.85 |
| | Mass flow rate | kg/hr | 147.99 | 147.00 | 145.95 | 144.84 | 143.68 |
| | Volumetric flow rate | m³/hr | 13.90 | 13.75 | 13.62 | 13.49 | 13.38 |
| | Volumetric capacity | kJ/m³ | 1554 | 1571 | 1586 | 1601 | 1615 |
| | Pressure drop | kPa/m | 890 | 876 | 862 | 850 | 837 |
| | GWP (TAR BASIS) | | 433 | 498 | 562 | 627 | 692 |
| | F/(F + H) | | 0.514 | 0.515 | 0.515 | 0.516 | 0.517 |
| | Capacity relative to 1234yf | | 100.9% | 102.0% | 103.0% | 104.0% | 104.9% |
| | Relative COP | | 109.0% | 109.1% | 109.1% | 109.2% | 109.3% |
| | Relative pressure drop | | 71.8% | 70.7% | 69.6% | 68.6% | 67.6% |

TABLE 16

Theoretical Performance Data of Selected R-152a/R-1234ze(E)/R-134a Blends containing 35% b/w R-152a

| | | | | | | | | |
|---|---|---|---|---|---|---|---|---|
| R-152a (% b/w) | | | | | 35 | 35 | 35 | 35 |
| R-134a (% b/w) | | | | | 10 | 15 | 20 | 25 |
| R-1234ze(E) (% b/w) | | | | | 55 | 50 | 45 | 40 |
| | | | COMPARATIVE DATA | | | | | |
| Calculation results | | 134a | R1234yf | R1234ze(E) | 35/10/55 | 35/15/50 | 35/20/45 | 35/25/40 |
| Pressure ratio | | 5.79 | 5.24 | 5.75 | 5.66 | 5.66 | 5.66 | 5.66 |
| Volumetric efficiency | | 83.6% | 84.7% | 82.8% | 84.3% | 84.3% | 84.3% | 84.4% |
| condenser glide | K | 0.0 | 0.0 | 0.0 | 0.4 | 0.3 | 0.3 | 0.3 |
| Evaporator glide | K | 0.0 | 0.0 | 0.0 | 0.2 | 0.2 | 0.2 | 0.1 |
| Evaporator inlet temperature | °C. | 0.0 | 0.0 | 0.0 | −0.1 | −0.1 | −0.1 | −0.1 |
| Condenser exit temperature | °C. | 55.0 | 55.0 | 55.0 | 54.8 | 54.8 | 54.8 | 54.9 |
| Condenser P | bar | 16.88 | 16.46 | 12.38 | 14.59 | 14.79 | 14.97 | 15.14 |
| Evaporator P | bar | 2.92 | 3.14 | 2.15 | 2.58 | 2.61 | 2.64 | 2.67 |
| Refrigeration effect | kJ/kg | 123.76 | 94.99 | 108.63 | 143.70 | 144.45 | 145.25 | 146.12 |
| COP | | 2.03 | 1.91 | 2.01 | 2.09 | 2.09 | 2.09 | 2.09 |
| Discharge T | °C. | 99.15 | 92.88 | 86.66 | 99.25 | 99.82 | 100.41 | 101.00 |
| Mass flow rate | kg/hr | 174.53 | 227.39 | 198.83 | 150.31 | 149.53 | 148.71 | 147.83 |
| Volumetric flow rate | m³/hr | 13.16 | 14.03 | 18.29 | 14.58 | 14.38 | 14.20 | 14.03 |
| Volumetric capacity | kJ/m³ | 1641 | 1540 | 1181 | 1482 | 1502 | 1522 | 1540 |
| Pressure drop | kPa/m | 953 | 1239 | 1461 | 944 | 927 | 912 | 897 |
| GWP (TAR BASIS) | | | | 6 | 175 | 240 | 305 | 369 |
| F/(F + H) | | | | 0.667 | 0.508 | 0.508 | 0.509 | 0.510 |
| Capacity relative to 1234yf | | 106.6% | 100.0% | 76.7% | 96.2% | 97.6% | 98.8% | 100.0% |
| Relative COP | | 106.0% | 100.0% | 105.3% | 109.1% | 109.1% | 109.1% | 109.1% |
| Relative pressure drop | | 76.9% | 100.0% | 117.9% | 76.2% | 74.9% | 73.6% | 72.4% |

TABLE 16-continued

Theoretical Performance Data of Selected R-152a/R-1234ze(E)/R-134a Blends containing 35% b/w R-152a

| | | | | | | | |
|---|---|---|---|---|---|---|---|
| | R-152a (% b/w) | | 35 | 35 | 35 | 35 | 35 |
| | R-134a (% b/w) | | 30 | 35 | 40 | 45 | 50 |
| | R-1234ze(E) (% b/w) | | 35 | 30 | 25 | 20 | 15 |
| | Calculation results | | 35/30/35 | 35/35/30 | 35/40/25 | 35/45/20 | 35/50/15 |
| | Pressure ratio | | 5.67 | 5.68 | 5.69 | 5.70 | 5.71 |
| | Volumetric efficiency | | 84.4% | 84.4% | 84.4% | 84.4% | 84.5% |
| | condenser glide | K | 0.2 | 0.2 | 0.2 | 0.1 | 0.1 |
| | Evaporator glide | K | 0.1 | 0.1 | 0.1 | 0.1 | 0.0 |
| | Evaporator inlet temperature | ° C. | 0.0 | 0.0 | 0.0 | 0.0 | 0.0 |
| | Condenser exit temperature | ° C. | 54.9 | 54.9 | 54.9 | 54.9 | 54.9 |
| | Condenser P | bar | 15.30 | 15.44 | 15.58 | 15.71 | 15.82 |
| | Evaporator P | bar | 2.70 | 2.72 | 2.74 | 2.76 | 2.77 |
| | Refrigeration effect | kJ/kg | 147.05 | 148.05 | 149.12 | 150.27 | 151.49 |
| | COP | | 2.09 | 2.09 | 2.09 | 2.09 | 2.09 |
| | Discharge T | ° C. | 101.61 | 102.23 | 102.86 | 103.51 | 104.17 |
| | Mass flow rate | kg/hr | 146.89 | 145.90 | 144.85 | 143.74 | 142.58 |
| | Volumetric flow rate | m$^3$/hr | 13.87 | 13.72 | 13.59 | 13.47 | 13.35 |
| | Volumetric capacity | kJ/m$^3$ | 1558 | 1574 | 1590 | 1604 | 1617 |
| | Pressure drop | kPa/m | 882 | 869 | 856 | 843 | 831 |
| | GWP (TAR BASIS) | | 434 | 499 | 564 | 628 | 693 |
| | F/(F + H) | | 0.510 | 0.511 | 0.512 | 0.513 | 0.513 |
| | Capacity relative to 1234yf | | 101.2% | 102.2% | 103.2% | 104.2% | 105.1% |
| | Relative COP | | 109.1% | 109.2% | 109.3% | 109.3% | 109.5% |
| | Relative pressure drop | | 71.2% | 70.1% | 69.1% | 68.0% | 67.1% |

TABLE 17

Theoretical Performance Data of Selected R-152a/R-1234ze(E)/R-134a Blends containing 36% b/w R-152a

| | | | | | | | | | |
|---|---|---|---|---|---|---|---|---|---|
| R-152a (% b/w) | | | | | | 36 | 36 | 36 | 36 |
| R-134a (% b/w) | | | | | | 10 | 15 | 20 | 25 |
| R-1234ze(E) (% b/w) | | | | | | 54 | 49 | 44 | 39 |
| | | | COMPARATIVE DATA | | | | | | |
| Calculation results | | | 134a | R1234yf | R1234ze(E) | 36/10/54 | 36/15/49 | 36/20/44 | 36/25/39 |
| Pressure ratio | | | 5.79 | 5.24 | 5.75 | 5.66 | 5.66 | 5.66 | 5.66 |
| Volumetric efficiency | | | 83.6% | 84.7% | 82.8% | 84.3% | 84.3% | 84.4% | 84.4% |
| condenser glide | K | | 0.0 | 0.0 | 0.0 | 0.3 | 0.3 | 0.3 | 0.3 |
| Evaporator glide | K | | 0.0 | 0.0 | 0.0 | 0.2 | 0.2 | 0.1 | 0.1 |
| Evaporator inlet temperature | ° C. | | 0.0 | 0.0 | 0.0 | −0.1 | −0.1 | −0.1 | −0.1 |
| Condenser exit temperature | ° C. | | 55.0 | 55.0 | 55.0 | 54.8 | 54.8 | 54.9 | 54.9 |
| Condenser P | bar | | 16.88 | 16.46 | 12.38 | 14.62 | 14.81 | 14.99 | 15.15 |
| Evaporator P | bar | | 2.92 | 3.14 | 2.15 | 2.59 | 2.62 | 2.65 | 2.68 |
| Refrigeration effect | kJ/kg | | 123.76 | 94.99 | 108.63 | 144.74 | 145.50 | 146.32 | 147.20 |
| COP | | | 2.03 | 1.91 | 2.01 | 2.09 | 2.09 | 2.09 | 2.09 |
| Discharge T | ° C. | | 99.15 | 92.88 | 86.66 | 99.56 | 100.14 | 100.72 | 101.32 |
| Mass flow rate | kg/hr | | 174.53 | 227.39 | 198.83 | 149.23 | 148.45 | 147.62 | 146.74 |
| Volumetric flow rate | m$^3$/hr | | 13.16 | 14.03 | 18.29 | 14.53 | 14.34 | 14.16 | 13.99 |
| Volumetric capacity | kJ/m$^3$ | | 1641 | 1540 | 1181 | 1487 | 1507 | 1526 | 1544 |
| Pressure drop | kPa/m | | 953 | 1239 | 1461 | 936 | 920 | 904 | 889 |
| GWP (TAR BASIS) | | | | | 6 | 176 | 241 | 306 | 371 |
| F/(F + H) | | | | | 0.667 | 0.504 | 0.505 | 0.505 | 0.506 |
| Capacity relative to 1234yf | | | 106.6% | 100.0% | 76.7% | 96.6% | 97.9% | 99.1% | 100.3% |
| Relative COP | | | 106.0% | 100.0% | 105.3% | 109.1% | 109.2% | 109.2% | 109.2% |
| Relative pressure drop | | | 76.9% | 100.0% | 117.9% | 75.5% | 74.2% | 73.0% | 71.8% |

TABLE 17-continued

Theoretical Performance Data of Selected R-152a/R-1234ze(E)/R-134a Blends containing 36% b/w R-152a

| | | | | | | | |
|---|---|---|---|---|---|---|---|
| R-152a (% b/w) | | | 36 | 36 | 36 | 36 | 36 |
| R-134a (% b/w) | | | 30 | 35 | 40 | 45 | 50 |
| R-1234ze(E) (% b/w) | | | 34 | 29 | 24 | 19 | 14 |
| | Calculation results | | 36/30/34 | 36/35/29 | 36/40/24 | 36/45/19 | 36/50/14 |
| | Pressure ratio | | 5.67 | 5.68 | 5.69 | 5.70 | 5.71 |
| | Volumetric efficiency | | 84.4% | 84.4% | 84.5% | 84.5% | 84.5% |
| | condenser glide | K | 0.2 | 0.2 | 0.2 | 0.1 | 0.1 |
| | Evaporator glide | K | 0.1 | 0.1 | 0.1 | 0.1 | 0.0 |
| | Evaporator inlet temperature | °C. | 0.0 | 0.0 | 0.0 | 0.0 | 0.0 |
| | Condenser exit temperature | °C. | 54.9 | 54.9 | 54.9 | 54.9 | 54.9 |
| | Condenser P | bar | 15.31 | 15.45 | 15.59 | 15.71 | 15.82 |
| | Evaporator P | bar | 2.70 | 2.72 | 2.74 | 2.76 | 2.77 |
| | Refrigeration effect | kJ/kg | 148.15 | 149.16 | 150.25 | 151.42 | 152.66 |
| | COP | | 2.09 | 2.09 | 2.09 | 2.09 | 2.10 |
| | Discharge T | °C. | 101.92 | 102.55 | 103.18 | 103.84 | 104.50 |
| | Mass flow rate | kg/hr | 145.80 | 144.81 | 143.76 | 142.65 | 141.49 |
| | Volumetric flow rate | m³/hr | 13.83 | 13.69 | 13.56 | 13.44 | 13.33 |
| | Volumetric capacity | kJ/m³ | 1561 | 1578 | 1593 | 1607 | 1620 |
| | Pressure drop | kPa/m | 875 | 862 | 849 | 837 | 825 |
| | GWP (TAR BASIS) | | 435 | 500 | 565 | 629 | 694 |
| | F/(F + H) | | 0.507 | 0.508 | 0.508 | 0.509 | 0.510 |
| | Capacity relative to 1234yf | | 101.4% | 102.5% | 103.5% | 104.4% | 105.2% |
| | Relative COP | | 109.2% | 109.3% | 109.4% | 109.5% | 109.6% |
| | Relative pressure drop | | 70.7% | 69.6% | 68.5% | 67.5% | 66.6% |

TABLE 18

Theoretical Performance Data of Selected R-152a/R-1234ze(E)/R-134a Blends containing 37% b/w R-152a

| R-152a (% b/w) | | | | | 37 | 37 | 37 | 37 |
|---|---|---|---|---|---|---|---|---|
| R-134a (% b/w) | | | | | 10 | 15 | 20 | 25 |
| R-1234ze(E) (% b/w) | | | | | 53 | 48 | 43 | 38 |

| | | COMPARATIVE DATA | | | | | | |
|---|---|---|---|---|---|---|---|---|
| Calculation results | | 134a | R1234yf | R1234ze(E) | 37/10/53 | 37/15/48 | 37/20/43 | 37/25/38 |
| Pressure ratio | | 5.79 | 5.24 | 5.75 | 5.66 | 5.66 | 5.66 | 5.67 |
| Volumetric efficiency | | 83.6% | 84.7% | 82.8% | 84.3% | 84.4% | 84.4% | 84.4% |
| condenser glide | K | 0.0 | 0.0 | 0.0 | 0.3 | 0.3 | 0.3 | 0.2 |
| Evaporator glide | K | 0.0 | 0.0 | 0.0 | 0.2 | 0.2 | 0.1 | 0.1 |
| Evaporator inlet temperature | °C. | 0.0 | 0.0 | 0.0 | −0.1 | −0.1 | −0.1 | −0.1 |
| Condenser exit temperature | °C. | 55.0 | 55.0 | 55.0 | 54.8 | 54.8 | 54.9 | 54.9 |
| Condenser P | bar | 16.88 | 16.46 | 12.38 | 14.65 | 14.83 | 15.01 | 15.17 |
| Evaporator P | bar | 2.92 | 3.14 | 2.15 | 2.59 | 2.62 | 2.65 | 2.68 |
| Refrigeration effect | kJ/kg | 123.76 | 94.99 | 108.63 | 145.78 | 146.56 | 147.39 | 148.29 |
| COP | | 2.03 | 1.91 | 2.01 | 2.09 | 2.09 | 2.09 | 2.09 |
| Discharge T | °C. | 99.15 | 92.88 | 86.66 | 99.87 | 100.45 | 101.03 | 101.63 |
| Mass flow rate | kg/hr | 174.53 | 227.39 | 198.83 | 148.17 | 147.38 | 146.55 | 145.66 |
| Volumetric flow rate | m³/hr | 13.16 | 14.03 | 18.29 | 14.48 | 14.29 | 14.12 | 13.95 |
| Volumetric capacity | kJ/m³ | 1641 | 1540 | 1181 | 1491 | 1511 | 1530 | 1548 |
| Pressure drop | kPa/m | 953 | 1239 | 1461 | 928 | 912 | 897 | 882 |
| GWP (TAR BASIS) | | | | 6 | 178 | 242 | 307 | 372 |
| F/(F + H) | | | | 0.667 | 0.500 | 0.501 | 0.502 | 0.503 |
| Capacity relative to 1234yf | | 106.6% | 100.0% | 76.7% | 96.9% | 98.2% | 99.4% | 100.5% |
| Relative COP | | 106.0% | 100.0% | 105.3% | 109.2% | 109.2% | 109.3% | 109.3% |
| Relative pressure drop | | 76.9% | 100.0% | 117.9% | 74.9% | 73.6% | 72.4% | 71.2% |

TABLE 18-continued

Theoretical Performance Data of Selected R-152a/R-1234ze(E)/R-134a Blends containing 37% b/w R-152a

| | | | | | | | |
|---|---|---|---|---|---|---|---|
| R-152a (% b/w) | | | 37 | 37 | 37 | 37 | 37 |
| R-134a (% b/w) | | | 30 | 35 | 40 | 45 | 50 |
| R-1234ze(E) (% b/w) | | | 33 | 28 | 23 | 18 | 13 |

| | Calculation results | | 37/30/33 | 37/35/28 | 37/40/23 | 37/45/18 | 37/50/13 |
|---|---|---|---|---|---|---|---|
| Pressure ratio | | | 5.67 | 5.68 | 5.69 | 5.70 | 5.72 |
| Volumetric efficiency | | | 84.4% | 84.5% | 84.5% | 84.5% | 84.5% |
| condenser glide | K | | 0.2 | 0.2 | 0.2 | 0.1 | 0.1 |
| Evaporator glide | K | | 0.1 | 0.1 | 0.1 | 0.0 | 0.0 |
| Evaporator inlet temperature | °C. | | 0.0 | 0.0 | 0.0 | 0.0 | 0.0 |
| Condenser exit temperature | °C. | | 54.9 | 54.9 | 54.9 | 54.9 | 54.9 |
| Condenser P | bar | | 15.32 | 15.47 | 15.60 | 15.72 | 15.82 |
| Evaporator P | bar | | 2.70 | 2.72 | 2.74 | 2.76 | 2.77 |
| Refrigeration effect | kJ/kg | | 149.25 | 150.28 | 151.39 | 152.57 | 153.83 |
| COP | | | 2.09 | 2.09 | 2.09 | 2.10 | 2.10 |
| Discharge T | °C. | | 102.24 | 102.87 | 103.51 | 104.16 | 104.83 |
| Mass flow rate | kg/hr | | 144.72 | 143.73 | 142.68 | 141.57 | 140.42 |
| Volumetric flow rate | m$^3$/hr | | 13.80 | 13.66 | 13.53 | 13.42 | 13.31 |
| Volumetric capacity | kJ/m$^3$ | | 1565 | 1581 | 1596 | 1610 | 1623 |
| Pressure drop | kPa/m | | 868 | 855 | 843 | 830 | 819 |
| GWP (TAR BASIS) | | | 436 | 501 | 566 | 630 | 695 |
| F/(F + H) | | | 0.503 | 0.504 | 0.505 | 0.506 | 0.506 |
| Capacity relative to 1234yf | | | 101.7% | 102.7% | 103.7% | 104.6% | 105.4% |
| Relative COP | | | 109.3% | 109.4% | 109.5% | 109.6% | 109.7% |
| Relative pressure drop | | | 70.1% | 69.0% | 68.0% | 67.0% | 66.1% |

TABLE 19

Theoretical Performance Data of Selected R-152a/R-1234ze(E)/R-134a Blends containing 38% b/w R-152a

| | | | | | |
|---|---|---|---|---|---|
| R-152a (% b/w) | | 38 | 38 | 38 | 38 |
| R-134a (% b/w) | | 10 | 15 | 20 | 25 |
| R-1234ze(E) (% b/w) | | 52 | 47 | 42 | 37 |

| | | COMPARATIVE DATA | | | | | | |
|---|---|---|---|---|---|---|---|---|
| Calculation results | | 134a | R1234yf | R1234ze(E) | 38/10/52 | 38/15/47 | 38/20/42 | 38/25/37 |
| Pressure ratio | | 5.79 | 5.24 | 5.75 | 5.66 | 5.66 | 5.66 | 5.67 |
| Volumetric efficiency | | 83.6% | 84.7% | 82.8% | 84.3% | 84.4% | 84.4% | 84.4% |
| condenser glide | K | 0.0 | 0.0 | 0.0 | 0.3 | 0.3 | 0.3 | 0.2 |
| Evaporator glide | K | 0.0 | 0.0 | 0.0 | 0.2 | 0.1 | 0.1 | 0.1 |
| Evaporator inlet temperature | °C. | 0.0 | 0.0 | 0.0 | −0.1 | −0.1 | −0.1 | −0.1 |
| Condenser exit temperature | °C. | 55.0 | 55.0 | 55.0 | 54.8 | 54.9 | 54.9 | 54.9 |
| Condenser P | bar | 16.88 | 16.46 | 12.38 | 14.67 | 14.85 | 15.02 | 15.19 |
| Evaporator P | bar | 2.92 | 3.14 | 2.15 | 2.59 | 2.63 | 2.65 | 2.68 |
| Refrigeration effect | kJ/kg | 123.76 | 94.99 | 108.63 | 146.82 | 147.62 | 148.46 | 149.38 |
| COP | | 2.03 | 1.91 | 2.01 | 2.09 | 2.09 | 2.09 | 2.09 |
| Discharge T | °C. | 99.15 | 92.88 | 86.66 | 100.18 | 100.76 | 101.35 | 101.95 |
| Mass flow rate | kg/hr | 174.53 | 227.39 | 198.83 | 147.11 | 146.33 | 145.49 | 144.60 |
| Volumetric flow rate | m$^3$/hr | 13.16 | 14.03 | 18.29 | 14.44 | 14.25 | 14.08 | 13.92 |
| Volumetric capacity | kJ/m$^3$ | 1641 | 1540 | 1181 | 1496 | 1516 | 1534 | 1552 |
| Pressure drop | kPa/m | 953 | 1239 | 1461 | 920 | 904 | 889 | 875 |
| GWP (TAR BASIS) | | | | 6 | 179 | 243 | 308 | 373 |
| F/(F + H) | | | | 0.667 | 0.497 | 0.498 | 0.498 | 0.499 |
| Capacity relative to 1234yf | | 106.6% | 100.0% | 76.7% | 97.2% | 98.4% | 99.7% | 100.8% |
| Relative COP | | 106.0% | 100.0% | 105.3% | 109.3% | 109.3% | 109.4% | 109.4% |
| Relative pressure drop | | 76.9% | 100.0% | 117.9% | 74.2% | 73.0% | 71.8% | 70.6% |

TABLE 19-continued

Theoretical Performance Data of Selected R-152a/R-1234ze(E)/R-134a Blends containing 38% b/w R-152a

| | | | | | | |
|---|---|---|---|---|---|---|
| R-152a (% b/w) | | 38 | 38 | 38 | 38 | 38 |
| R-134a (% b/w) | | 30 | 35 | 40 | 45 | 50 |
| R-1234ze(E) (% b/w) | | 32 | 27 | 22 | 17 | 12 |
| Calculation results | | 38/30/32 | 38/35/27 | 38/40/22 | 38/45/17 | 38/50/12 |
| Pressure ratio | | 5.67 | 5.68 | 5.69 | 5.71 | 5.72 |
| Volumetric efficiency | | 84.5% | 84.5% | 84.5% | 84.5% | 84.5% |
| condenser glide | K | 0.2 | 0.2 | 0.1 | 0.1 | 0.1 |
| Evaporator glide | K | 0.1 | 0.1 | 0.1 | 0.0 | 0.0 |
| Evaporator inlet temperature | °C. | 0.0 | 0.0 | 0.0 | 0.0 | 0.0 |
| Condenser exit temperature | °C. | 54.9 | 54.9 | 54.9 | 54.9 | 54.9 |
| Condenser P | bar | 15.34 | 15.48 | 15.60 | 15.72 | 15.82 |
| Evaporator P | bar | 2.70 | 2.72 | 2.74 | 2.76 | 2.77 |
| Refrigeration effect | kJ/kg | 150.36 | 151.41 | 152.53 | 153.73 | 155.00 |
| COP | | 2.09 | 2.09 | 2.10 | 2.10 | 2.10 |
| Discharge T | °C. | 102.56 | 103.19 | 103.83 | 104.48 | 105.15 |
| Mass flow rate | kg/hr | 143.66 | 142.66 | 141.61 | 140.51 | 139.36 |
| Volumetric flow rate | $m^3$/hr | 13.77 | 13.63 | 13.51 | 13.39 | 13.29 |
| Volumetric capacity | $kJ/m^3$ | 1569 | 1585 | 1599 | 1613 | 1625 |
| Pressure drop | kPa/m | 862 | 849 | 836 | 824 | 813 |
| GWP (TAR BASIS) | | 438 | 502 | 567 | 632 | 696 |
| F/(F + H) | | 0.500 | 0.501 | 0.501 | 0.502 | 0.503 |
| Capacity relative to 1234yf | | 101.9% | 102.9% | 103.9% | 104.8% | 105.6% |
| Relative COP | | 109.4% | 109.5% | 109.6% | 109.7% | 109.8% |
| Relative pressure drop | | 69.5% | 68.5% | 67.5% | 66.5% | 65.6% |

What is claimed is:

1. A heat transfer composition consisting essentially of from about 22 to about 38% by weight R-152a, from about 10 to about 50% R-134a, and from about 12 to about 68% by weight R-1234ze(E).

2. A composition according to claim 1, consisting essentially of from about 22 to about 38% by weight R-152a, from about 20 to about 50% R-134a, and from about 12 to about 60% by weight R-1234ze(E).

3. A composition according to claim 1, consisting essentially of from about 28 to about 38% by weight R-152a, from about 15 to about 50% R-134a, and from about 12 to about 60% by weight R-1234ze(E).

4. A composition according to claim 1, consisting essentially of from about 31 to about 38% by weight R-152a, from about 10 to about 50% R-134a, and from about 12 to about 60% by weight R-1234ze(E).

5. A composition according to claim 1, wherein the composition has a GWP of less than 1000.

6. A composition according to claim 1, wherein the temperature glide is less than about 10 K.

7. A composition according to claim 1, wherein the composition has volumetric refrigeration capacity within about 15% of an existing refrigerant that it is intended to replace.

8. A composition according to claim 7, wherein the volumetric refrigeration capacity of the composition is at least 90% that of R-1234yf.

9. A composition according to claim 8, wherein the volumetric refrigeration capacity of the composition is at least 95% that of R-1234yf.

10. A composition according to claim 9, where the composition has a lower flammable limit at 23° C. (% v/v) of 10-14%.

11. A composition according to claim 8, where the composition has a lower flammable limit at 23° C. (% v/v) of 10-14%.

12. A composition according to claim 1, wherein the composition is less flammable than R-152a alone or R-1234yf alone.

13. A composition according to claim 12, wherein the composition has at least one of:
 (a) a higher flammable limit;
 (b) a higher ignition energy; or
 (c) a lower flame velocity
compared to R-152a alone or R-1234yf alone.

14. A composition according to claim 13, wherein the composition is non-flammable.

15. A composition according to claim 1, wherein the composition has a cycle efficiency within about 5% of an existing refrigerant that it is intended to replace.

16. A composition according to claim 1, wherein the composition has a compressor discharge temperature within about 15 K of an existing refrigerant that it is intended to replace.

17. A composition comprising a lubricant and a composition according to claim 1.

18. A composition according to claim 17 wherein the lubricant is selected from mineral oil, silicone oil, polyalkyl benzenes, polyol esters, polyalkylene glycols, polyalkylene glycol esters, polyvinyl ethers, poly (alpha-olefins) and combinations thereof.

19. A composition according to claim 1 further comprising a stabilizer.

20. A composition according to claim 19, wherein the stabilizer is selected from diene-based compounds, phosphates, phenol compounds and epoxides, and mixtures thereof.

21. A composition comprising a flame retardant and a composition according to claim 1.

22. A composition according to claim 21, wherein additional flame retardant is selected from the group consisting of tri-(2-chloroethyl)-phosphate, (chloropropyl) phosphate, tri- (2,3-dibromopropyl)-phosphate, tri-(1,3-dichloropropyl)-phosphate, diammonium phosphate, halogenated aromatic compounds, antimony oxide, aluminium trihydrate, polyvinyl chloride, a fluorinated iodocarbon, a fluorinated bromocarbon, trifluoro iodomethane, perfluoroalkyl amines, bromo-fluoroalkyl amines and mixtures thereof.

23. A composition according to claim 1, wherein the composition is a refrigerant composition.

24. A heat transfer device containing the composition of claim 1.

25. A heat transfer device according to claim 24 wherein the heat transfer device is a refrigeration device.

26. A heat transfer device according to claim 25 which is selected from the group consisting of automotive air conditioning systems, residential air conditioning systems, commercial air conditioning systems, residential refrigerator systems, residential freezer systems, commercial refrigerator systems, commercial freezer systems, chiller air conditioning systems, chiller refrigeration systems, and commercial or residential heat pump systems.

27. A heat transfer device according to claim 25 further comprising a compressor.

28. A blowing agent comprising the composition of claim 1.

29. A foamable composition comprising the composition of claim 1 and one or more components capable of forming foam, wherein the one or more components capable of forming foam are selected from polyurethanes, thermoplastic polymers and resins, such as polystyrene, and epoxy resins, and mixtures thereof.

30. A foam comprising the composition of claim 1.

31. A sprayable composition comprising material to be sprayed and a propellant comprising the composition of claim 1.

32. A method for cooling an article which comprises condensing the composition of claim 1 and thereafter evaporating the composition in the vicinity of the article to be cooled.

33. A method for heating an article which comprises condensing the composition of claim 1 in the vicinity of the article to be heated and thereafter evaporating the composition.

34. A method for extracting a substance from biomass comprising contacting biomass with a solvent comprising the composition of claim 1, and separating the substance from the solvent.

35. A method of cleaning an article comprising contacting the article with a solvent comprising the composition of claim 1.

36. A method of extracting a material from an aqueous solution comprising contacting the aqueous solution with a solvent comprising the composition of claim 1, and separating the substance from the solvent.

37. A method of extracting a material from a particulate solid matrix comprising contacting the particulate solid matrix with a solvent comprising the composition of claim 1, and separating the substance from the solvent.

38. A mechanical power generation device containing the composition of claim 1.

39. A mechanical power generating device according to claim 38 which is adapted to use a Rankine Cycle or modification thereof to generate work from heat.

40. A method of retrofitting a heat transfer device comprising the step of removing an existing heat transfer fluid, and introducing the composition of claim 1.

41. A method of claim 40 wherein the heat transfer device is a refrigeration device.

42. A method according to claim 41 wherein the heat transfer device is an air conditioning system.

43. A method for reducing the environmental impact arising from the operation of a device comprising an existing compound or composition, the method comprising replacing at least partially the existing compound or composition with the composition of claim 1.

44. A method according to claim 43 wherein the product is selected from a heat transfer device, a blowing agent, a foamable composition, a sprayable composition, a solvent or a mechanical power generation device.

45. A method according to claim 44 wherein the product is a heat transfer device.

46. A method according to claim 43, wherein the existing compound or composition is a heat transfer compound or composition.

47. A method according to claim 46 wherein the heat transfer composition is a refrigerant selected from R-134a, R-1234yf and R-152a.

48. A method for preparing the composition of claim 1, the method comprising introducing R-1234ze(E) and R-152a, into a heat transfer device containing an existing heat transfer fluid which is R-134a.

49. A method according to claim 48, further comprising removing at least some of the existing R-134a from the heat transfer device before introducing the R-1234ze(E) and R-152a.

50. A method for generating greenhouse gas emission credit comprising (i) replacing an existing compound or composition with the composition of claim 1, wherein the composition has a lower GWP than the existing compound or composition; and (ii) obtaining greenhouse gas emission credit for said replacing step.

51. A method of claim 50 wherein the use of the composition results in a lower Total Equivalent Warning Impact or a lower Life-Cycle Carbon Production than is attained by use of the existing compound or composition.

52. A method of claim 50 carried out on a product from the fields of air-conditioning, refrigeration, heat transfer, blowing agents, aerosols or sprayable propellants, gaseous dielectrics, cryosurgery, veterinary procedures, dental procedures, fire extinguishing, flame suppression, solvents, cleaners, air horns, pellet guns, topical anesthetics, and expansion applications.

53. A method according to claim 52 wherein the product is selected from a heat transfer device, a blowing agent, a foamable composition, a sprayable composition, a solvent or a mechanical power generation device.

54. A method according to claim 50 wherein the existing compound or composition is a heat transfer compound or composition.

* * * * *